US009661053B2

(12) United States Patent
Parikh et al.

(10) Patent No.: US 9,661,053 B2
(45) Date of Patent: *May 23, 2017

(54) GENERATING A PLURALITY OF STREAMS

(71) Applicant: IMAGINE COMMUNICATIONS CORP., Frisco, TX (US)

(72) Inventors: Keyur R. Parikh, Mason, OH (US); Junius A. Kim, Cincinnati, OH (US)

(73) Assignee: GatesAir, Inc., Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/173,963

(22) Filed: Jun. 6, 2016

(65) Prior Publication Data

US 2016/0285944 A1 Sep. 29, 2016

Related U.S. Application Data

(63) Continuation of application No. 13/839,660, filed on Mar. 15, 2013, now Pat. No. 9,363,131.

(51) Int. Cl.
*H04L 29/06* (2006.01)
*H04N 21/2343* (2011.01)
(Continued)

(52) U.S. Cl.
CPC .............. *H04L 65/80* (2013.01); *H04L 1/007* (2013.01); *H04L 1/0009* (2013.01);
(Continued)

(58) Field of Classification Search
CPC ... H04L 65/80; H04L 65/4076; H04L 65/602; H04L 65/607; H04L 1/0061;
(Continued)

(56) References Cited

U.S. PATENT DOCUMENTS 6,868,083 B2 3/2005 Apostolopoulos et al.
6,995,693 B1 2/2006 Cross
(Continued)

FOREIGN PATENT DOCUMENTS

WO 02067588 A2 8/2002
WO 2004075561 A1 9/2004

OTHER PUBLICATIONS

Liang, et al., "Multi-Stream Voice Over IP Using Packet Path Diversity", IEEE Publication, (2001), pp. 555-560.
(Continued)

*Primary Examiner* — Paul H Masur
(74) *Attorney, Agent, or Firm* — Tarolli, Sundheim, Covell & Tummino LLP

(57) ABSTRACT

A device can include a stream builder configured to encode media data at a plurality of different coding rates and to generate a plurality of streams encapsulating the encoded media data. Each of the plurality of streams can have an associated protection level that corresponds to an ability of packet reconstruction and a bandwidth cost. The system can also include a stream replicator configured to transmit each of the plurality of streams to a content receiver via N number of networks. The system can further include an adapter configured to control the coding rate and the protection level of each of the plurality of streams based on a feedback signal transmitted from the content receiver. The feedback signal can characterize a packet loss rate of each of the plurality of streams.

22 Claims, 13 Drawing Sheets

(51) Int. Cl.
*H04N 21/238* (2011.01)
*H04N 21/442* (2011.01)
*H04N 21/63* (2011.01)
*H04L 1/00* (2006.01)
*H04L 1/06* (2006.01)
*H04L 1/08* (2006.01)
*H04N 21/658* (2011.01)

(52) U.S. Cl.
CPC .............. *H04L 1/0061* (2013.01); *H04L 1/06* (2013.01); *H04L 1/08* (2013.01); *H04L 29/0651* (2013.01); *H04L 65/4076* (2013.01); *H04L 65/602* (2013.01); *H04L 65/607* (2013.01); *H04L 69/14* (2013.01); *H04N 21/23439* (2013.01); *H04N 21/23805* (2013.01); *H04N 21/44209* (2013.01); *H04N 21/631* (2013.01); *H04L 2001/0096* (2013.01); *H04L 2212/00* (2013.01); *H04N 21/6582* (2013.01)

(58) Field of Classification Search
CPC . H04L 2212/00; H04L 29/06; H04L 29/0651; H04L 69/14; H04L 1/0009; H04L 1/007; H04L 1/06; H04L 1/08; H04N 21/23439; H04N 21/2347; H04N 21/23805; H04N 21/6582; H04N 21/44209; H04N 21/631
See application file for complete search history.

(56) References Cited

U.S. PATENT DOCUMENTS

| | | |
|---|---|---|
| 2003/0202506 A1 | 10/2003 | Perkins et al. |
| 2006/0028991 A1* | 2/2006 | Tan .......................... H04L 12/26 370/237 |
| 2007/0153679 A1* | 7/2007 | Jost .................. H04N 21/23439 370/218 |
| 2007/0177579 A1* | 8/2007 | Diethorn ................. H04L 45/24 370/352 |
| 2008/0243489 A1 | 10/2008 | Chamberlain |
| 2008/0256418 A1 | 10/2008 | Luby et al. |
| 2009/0279436 A1 | 11/2009 | Chin |
| 2012/0087634 A1 | 4/2012 | Lalwaney |
| 2012/0210190 A1 | 8/2012 | Luby et al. |
| 2013/0028316 A1 | 1/2013 | Leontaris et al. |
| 2013/0208809 A1 | 8/2013 | Lu et al. |

OTHER PUBLICATIONS

European Search Report, European Patent Application No. EP14000948; Date of Completion of the Search: Nov. 30, 2016, 7 pgs.

* cited by examiner

GENERATING A PLURALITY OF STREAMS

CROSS-REFERENCE TO RELATED APPLICATION

This application is a continuation of U.S. patent application Ser. No. 13/839,660, filed Mar. 15, 2013 (now U.S. Pat. No. 9,363,131), and entitled GENERATING A PLURALITY OF STREAMS, the entire contents of which is incorporated herein by reference.

TECHNICAL FIELD

This disclosure relates to generating a plurality of streams. More particularly, this disclosure relates to generating a plurality of streams that encapsulate media data that has been encoded at different coding rates.

BACKGROUND

Streaming media is media that is constantly received by and presented to a destination (e.g., a client) while being delivered by a provider (e.g., a host). Moreover, "to stream" can refer to the process of delivering media in this manner. The term "streaming media" can refer to the delivery method of the media rather than the media itself.

In some examples of streaming media, a client media player can begin playing a media file (such as an audio file or audio visual file) before the entire media file has been transmitted. Distinguishing the delivery method from the media distributed applies to telecommunications networks (e.g., computer networks), as most other delivery systems are either inherently streaming (e.g., radio, television) or inherently non-streaming (e.g., books, video cassettes, audio CDs). Moreover, the term "streaming media" can apply to media other than video and audio media such as live closed captioning, stock ticker, real-time text or the like.

SUMMARY

One example relates to a device comprising a stream builder configured to encode media data at a plurality of different coding rates. The stream builder can also be configured to generate a plurality of streams encapsulating the encoded media data. Each of the plurality of streams can have an associated protection level that corresponds to an ability of packet reconstruction and a bandwidth cost. The device can also include a stream replicator configured to transmit each of the plurality of streams to a content receiver via N number of networks, wherein N is an integer greater than or equal to two. The device can further include an adapter configured to control the coding rate and the protection level of each of the plurality of streams based on a feedback signal transmitted from the content receiver. The feedback signal can characterize a packet loss rate of each of the plurality of streams.

Another example relates to a system for providing real-time data. The system can include a content provider that can include a stream builder configured to encode media data at a plurality of different coding rates and to generate a plurality of streams encapsulating the encoded media data. Each of the plurality of streams can have an associated protection level that corresponds to an ability of packet reconstruction and a bandwidth cost. The content provider can also include a stream replicator configured to transmit each of the plurality of streams to a content provider via N number of networks, wherein N is an integer greater than or equal to two. The content provider can further include an adapter configured to control the coding rate and the protection level of each of the plurality of streams based on user settings and a feedback signal.

The system can also include a content receiver that can include a plurality of group receivers. Each of the plurality of group receivers can be configured to receive each of the plurality of streams that have a common group identifier (ID). The content receiver can also include a plurality of packet recovery components. Each of the plurality of packet recovery components can be configured to store packets from streams with a common group ID in a respective receiving buffer of a plurality of receiving buffers. The content receiver can further include a decoder configured to select an active group from the plurality of receiving buffers based on an encoding format of packets stored at each of the plurality of receiving buffers. The content receiver can be further configured to decode a packet retrieved from the active group to generate an output signal.

Still another example relates to a method of providing real-time data. The method can include providing a plurality of streams to a content receiver via a plurality of different networks. Each of the plurality of streams can encapsulate media data that is encoded at a given coding rate of a plurality of different coding rates. The method can also include receiving a feedback signal from the content receiver. The feedback signal can characterize a packet loss rate experienced by the content receiver for each of the plurality of streams. The method can further include determining optimal desired coding rate and a desired protection level for each of the plurality of streams based on the feedback signal and on user settings.

DETAILED DESCRIPTION

A system can include a content provider configured for transmitting real-time content to a content receiver. The content provider (e.g., a studio-transmitter link) can generate a plurality of streams that encapsulate media data containing the real-time content, which can be provided at different coding rates and can include different protection levels (e.g., different amounts of error correction overhead). The streams can be provided to the content receiver via multiple networks (e.g., redundant networks). The content receiver can receive and decode packets in the plurality of streams as well as generate a feedback signal to the content provider that characterizes statistics about groups of the plurality of streams. Such statistics can include, for example, a packet loss rate and/or a loss profile. The feedback signal can be provided by a device (e.g., a transmitter-studio link) to the content provider. The content provider can be configured to adjust the coding rate and the protection level for each of the plurality of streams based on the feedback signal.

Figure 1:
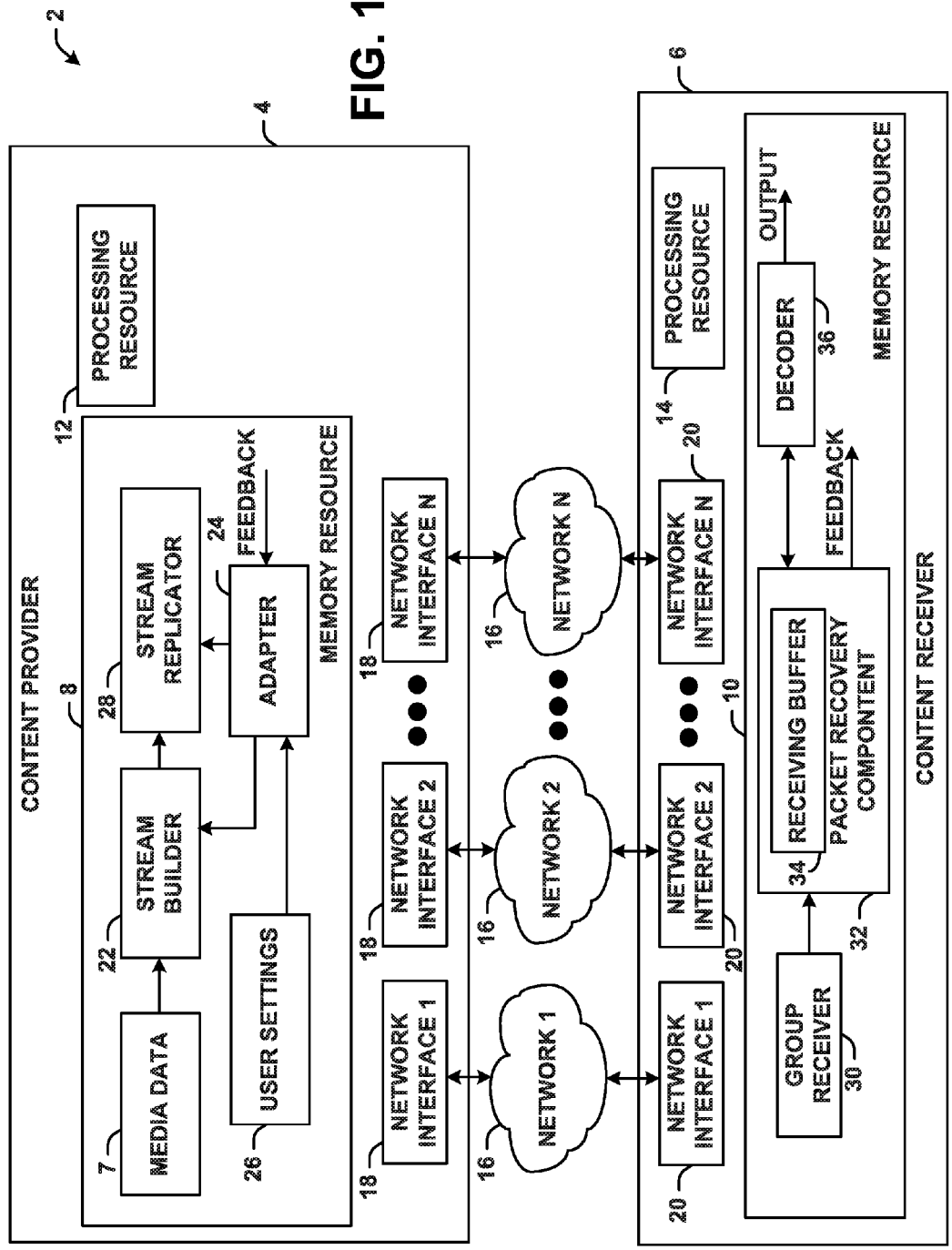
FIG. 1 illustrates an example of a system for providing real-time content from a content provider to a content receiver.

FIG. 1 illustrates an example of a system 2 for providing real-time content from a content provider 4 to a content receiver 6. The real-time content can be, for example, media data 7, such as an audio file, an audio video file, a real-time text file (e.g., closed captioning) or a combination thereof. The real-time content can represent, for example, a live event (e.g., a radio or television program). The content provider 4 can be, for example, a transmitter device (e.g., a studio-transmitter link). In some examples, the content provider 4 can be implemented as a distribution center for the real-time content. The content receiver 6 can be implemented, for example, in a repeater of the real-time content and/or in an end-user device such as a computer, a set-top box, a radio receiver (e.g., a satellite radio receiver) or the like.

The content provider 4 and the content receiver 6 can each be implemented, for example, as including computers. For instance, in some examples each of the content provider 4 and the content receiver 6 can include a memory resource 8 and 10 for storing machine readable instructions. The memory resource 8 and 10 of the content provider 4 and the content receiver 6 could be implemented, for example, as a non-transitory computer readable medium, such as volatile memory (e.g., random access memory), nonvolatile memory (e.g., a hard disk drive, a solid-state drive, flash memory or the like) or a combination thereof (e.g., firmware). Each of the content provider 4 and the content receiver 6 can also include one or more processing resources 12 and 14 to access the memory resource 8 and 10 and execute the machine-readable instructions. The processing resource 12 and 14 of the content provider 4 and the content receiver 6 can include a processor core. In other examples, as explained herein, the content provider 4 and/or the content receiver 6 can be implemented as a system of electrical components. For instance, the content provider 4 and/or the content receiver 6 could be implemented as a rack system with cards (e.g., containing electrical circuits) that communicate via a bus to control processing of signals communicated with respect to each of the provider and receiver devices.

The content provider 4 and the content receiver 6 can communicate over N number of networks 16, where N is an integer greater than or equal to two. Each of the content provider 4 and the content receiver 6 can include N number of network interfaces 18 and 20 to communicate with the N number of networks 16, such that a given network interface 18 of the content provider 4 and the content receiver 6 can communicate via a corresponding network. Each of the N number of networks 16 can be implemented, for example, as a packet streaming network, such as a network that employs an Internet protocol (e.g., TCP/IP, IPv6 or the like). In some examples, a given network of the N number of networks 16 can be a private network with a limited number of nodes connected thereto. In such a situation, the given network of the N number of networks 16 can represent a dedicated connection between the content provider 4 and the content receiver 6. Additionally or alternatively, another network of the N number of networks 16 can be a public network (e.g., the Internet). In some examples, a private network can have a "guaranteed" delivery connection profile and a public network can have a "best effort" connection profile. Accordingly, in some examples, the content provider 4 and the content receiver 6 can have redundant communications, such that the content provider 4 and the content receiver 6 can communicate even if one of the N number of networks 16 fails or performance has degraded.

The media data 7 that includes the real-time content to be provided from the content provider 4 to the content receiver 6 can be stored in the memory resource 8 of the content provider 4. The media data 7 can be stored, for example, in an uncompressed format or a compressed format (e.g., encoded format). For example, the media data can include ingested media, such as can be provided from a media source, such as in the form of analog media (e.g., amplitude modulated or frequency modulated media) or digital media (e.g., having a given resolution, such as standard definition or high definition digital media).

The ingested media data 7 can be provided to a stream builder 22 of the content provider 4. The stream builder 22 can encode the media data 7 into an encoded format and generate a stream that contains the media file in the encoded format, which stream can be transmitted to the content receiver 6 via the N number of networks 16. As used herein, the term "stream" denotes a sequence of data packets such as can include a sequence number identifying an order of a respective packet in the stream and a payload that encapsulates an encoded portion of the media data 7. The stream can be implemented in the Real-time Transfer Protocol (RTP) or other protocol configured for real-time data transfer. The stream builder 22 can be controlled by an adapter 24. The configuration settings can be controlled based on user settings 26, a feedback signal (labeled in FIG. 1 as "FEEDBACK") that can be provided from the content receiver 6 in a manner described herein or based on combination thereof.

The user settings 26 can characterize initial settings and/or constraints for each stream generated by the stream builder 22. The user settings 26 can be set in response to user input that can be provided via a graphical user interface (GUI). The user settings 26 can be employed by the adapter 24 to control the stream builder 22. Examples of the user settings 26 are included in Table 1. The user settings 26 included in Table 1 is not meant to be exhaustive. Instead, Table 1 includes examples of user settings 26 that could be employed by the adapter 24.

TABLE 1

| ELEMENT | DESCRIPTION |
| --- | --- |
| Network Output | Each stream is configured to egress out of one of the N network interfaces. |
| Group ID | Each stream is assigned a group. Multiple streams belonging to the same group share the same media payload (e.g., same codec/coding rate) and the same protection level. |
| Maximum Bandwidth | Each stream is assigned maximum overall bandwidth, which includes both source coding rate and protection level. Streams belonging to the same group have same settings. |
| Target Packet Loss Rate | Packet loss rate to achieve for a Group |
| Minimum Protection Level | Minimum protection level to apply to the group. |
| Connection Profile | Best effort, Guaranteed. In a Best effort connection profile the packet loss is assumed to be due to congestion, which will vary the total stream bandwidth by reducing the coding rate while keeping the protection level fixed. In a Guaranteed profile, the packet loss rate is assumed to be non-congestive and therefore the protection level is varied along with the coding rate to keep the overall stream bandwidth at the maximum rate. |

Based on the user settings 26, the adapter 24 can cause the stream builder 22 to encode the media data 7 at a specific coding rate. In some examples, the adapter 24 can cause the stream builder 22 to generate multiple streams with different coding rates for the same media data 7. Additionally, the adapter 24 can cause the stream builder 22 to add error correction codes to the generated streams. The correction codes could be, for example forward error correction codes (FEC). Moreover, a specific error correction code can be referred to as a protection level, such that the protection level corresponds to a particular FEC level of protection. The protection level thus can correspond to an ability to reconstruct the generated streams and a bandwidth cost (e.g., overhead added).

As one example, a given stream for the media data 7 can be generated by the stream builder 22 that has a current protection level set to the minimum protection level specified in the user settings 26 and a coding rate that is set based on the maximum bandwidth set in the user settings 26 and on the current protection level of the stream. Additionally, a group ID and a network output of the stream can be included in the given stream.

The given stream can be provided to a stream replicator 28. The stream replicator 28 can be controlled by the adapter 24. The stream replicator 28 can generate a duplicate (e.g., a copy) of the given stream and egress out each of the multiple copies of the stream to the N number of network interfaces 18 of the content provider 4, or some subset thereof. For instance, if the user settings 26 indicate that the given stream and another stream have the same Group ID, then the respective streams have the same coding rate, the same encoding format (e.g., the respective streams were encoded with the same encoding algorithm) and the same protection level. In such a situation, the adapter 24 can cause the stream replicator 28 to generate a duplicate of the given stream, which duplicate is the other stream. The given stream can be provided to the network interface 1 of the content provider 4, while the other stream can be provided to the network interface 2 or network interface N of the content provider 4.

Additionally or alternatively, based on the user settings 26, multiple streams can be generated for the media data 7 that have different Group IDs. For example, a given stream can have a given Group ID and another stream can have another Group ID, wherein the given and the other stream have different coding rates for the media data 7. In such a situation, the given and the other stream can be provided the network interface 1 and network interface 2 of the N number of network interfaces 18, respectively and transmitted to the content receiver 6 via networks 1 and 2 of the N number of networks 16. It is noted that in some examples, both the given and/or the other stream can be replicated by the stream replicator 28 in the manner described herein.

To facilitate understanding of the system 2, a first example is given (hereinafter, "the first example"). In the first example, the stream builder 22 can generate a different number of streams based on the media data 7 for each of three different groups of streams Group A, Group B and Group C, wherein each stream in a group of streams is provided over a different network of the N number of networks 16. Table 2 summarizes the streams in the first example.

TABLE 2

|  | GROUP A | GROUP B | GROUP C |
|---|---|---|---|
| STREAM 1 | YES | YES | YES |
| STREAM 2 | YES | YES | NO |
| STREAM 3 | YES | NO | NO |

Accordingly, as illustrated in Table 2, Group A has three streams, Group B has two streams and Group C has three streams. Thus, each stream can be identified by a group and a stream number. For instance, the first stream (stream 1) in Group A can be identified as stream (A,1). Table 3 illustrates initial settings of each of the streams in the first example.

TABLE 3

|  | CURRENT ENCODING RATE | CURRENT PROTECTION LEVEL | NETWORK ENTRY |
|---|---|---|---|
| STREAM (A, 1) | 100 kbit/s | 3 | 1 |
| STREAM (A, 2) | 100 kbit/s | 3 | 2 |
| STREAM (A, 3) | 100 kbit/s | 3 | 3 |
| STREAM (B, 1) | 256 kbit/s | 2 | 1 |
| STREAM (B, 2) | 256 kbit/s | 2 | 2 |
| STREAM (C, 1) | 1.5 Mbit/s | 1 | 3 |

In the first example, the streams can be provided over the network identified in the network entry of the initial settings of the streams. Moreover, the content receiver 6 can receive each stream via the N number of network interfaces 20 of the content provider 4. Moreover, a group receiver 30 stored in the memory resource 10 of the content receiver 6 can receive each stream that has the same Group ID. For example, the group receiver 30 can receive a given group of streams. In the first example, the group receiver 30 can be configured to receive streams in Group A. Thus, the group receiver 30 can receive streams (A,1), (A,2) and (A,3), which can be received at network interfaces 1, 2 and 3, respectively, of the content receiver 6. The group receiver 30 can provide each of the streams in Group A to a packet recovery component 32 that can be included in the memory resource 10 of the content receiver 6.

In the first example, each packet in each stream of Group A has the same coding rate and is encoding the same media data 7. Moreover, each stream of Group A is encoded with the same encoding algorithm and each stream of Group A has the same protection level. Accordingly, each stream in Group A has packets with the same sequence number. Moreover, each packet with the same sequence number in Group A has a payload that contains a same segment of the media data 7 in an encoded (e.g., compressed) format, which segment can be referred to as a time slice of the real time media data 7. Accordingly, the packet recovery component 32 can store a sequence of packets in a receiving buffer 34 (e.g., a jitter buffer), wherein each of the stored sequence of packets corresponds to a different time slice of the media data 7. For instance, if no packets are lost for each of the streams in Group A, the packet recovery component 32 can select a packet with a given sequence number from stream 1, 2 or 3 of Group A to store in the receiving buffer 34 and the other two packets with the given sequence number can be discarded since they contain redundant information. In another example, if only one packet is received that includes the given sequence number, that packet can be stored in the receiving buffer 34. In yet another example, if none of the streams has the given sequence number, the packet corresponding to the given sequence number can be marked as "lost" by the packet recovery component 32. Moreover, in such a situation, the packet recovery component 32 can attempt to reconstruct the packet with the given sequence number by employing embedded error correction codes of streams in Group A.

If the packet with a given sequence number cannot be reconstructed, the receiving buffer 34 can store an empty packet with a given sequence number with data that characterizes the packet as "unavailable". Accordingly, by providing the three streams over three different networks 16 (networks 1, 2 and 3), a resultant path diversity reduces the chance that a packet with a particular sequence number will be unavailable. Moreover, the chance that a packet with a particular sequence number will be unavailable can be further reduced by the inclusion of error codes defined by the protection level of each stream in Group A.

The packet recovery component 32 can generate a feedback signal (labeled in FIG. 1 as "FEEDBACK") that can be provided to the adapter 24 of the content provider 4 via one (or more) of the N number of networks 16. The feedback signal can include a group packet loss report that can include data that characterizes a loss rate of packets in the group. The loss rate of the packets in the group can correspond to a number of packets that are marked as "lost" in a given period of time. The feedback signal can also include a loss profile that can indicate whether a burst of packets (e.g., a sequence of packets with consecutive sequence numbers) has been lost or whether the lost packets are random (e.g., packet loss occurs intermittently).

In the first example, the group receiver 30 can represent multiple group receivers 30 and the packet recovery component 32 can represent multiple packet recovery components 32. Therefore, in the first example, the group receiver 30 that receives the streams in Group A can be considered to be a first group receiver 30 and the packet recovery component 32 that that stores packets from the streams in Group A in to the receiving buffer 34 can be considered to be a first packet recovery component 32. Accordingly, in the first example, a second group receiver 30 can receive the streams for Group B and a second packet recovery component 32 can store packets from streams in Group B. Moreover, in the first example, a third group receiver 30 can receive the stream for Group C and a third packet recovery component 32 can store packets from the stream in Group C. Thus, three receiving buffers 34 namely a first, second and third receiving buffer 34 can each contain a packets from streams for a corresponding group of streams (Group A, Group B and Group C).

In the first example, a decoder 36 of the content receiver 6 can examine the first, second and third receiving buffers 34 and determine which receiving buffer 34 stores packets with the highest coding rate. In the present example, the third receiving buffer 34 that stores packets from the stream in Group C will have the highest coding rate (1.5 Mbit/s). The decoder 36 can be configured to drain (e.g., retrieve and clear) the receiving buffer 34 with the highest coding rate and generate and output signal (labeled in FIG. 1 as "OUTPUT") that represents a decoded portion of the media data 7.

Additionally, as noted, a given packet in the receiving buffer 34 with the highest coding rate may be labeled as "unavailable". In such a situation, the decoder 36 can be configured to drain a packet corresponding to the given packet from a receiving buffer 34 with the next highest coding rate, which in the first example would be the second receiving buffer 34, which stores packets from the streams in Group B. In such a situation, the decoder 36 can be configured to decode the packet drain from Group B with a lower coding rate and then return to the draining and decoding of the packets stored in the third receiving buffer 34 from the streams of Group A with the highest coding rate. In this manner, the streams in the group with the highest coding rate that are reliably received can be decoded, such that a relatively high quality regeneration of the media data 7 can be achieved.

Additionally, the feedback signal from the packet recovery component 32 can be received at the adapter 24 of the memory resource 10 of the content receiver 6. In the first example, the feedback signal can include data characterizing a packet loss rate and a loss profile for each of the Groups A, B and C. For purposes of simplification of explanation, only data characterizing the packet loss rate and the loss profile of Group A is explained herein, but the data characterizing the packet loss rate and the loss profile of Groups B and C can be processed in a similar manner.

In the first example, the adapter 24 can employ the data characterizing the packet loss rate and the loss profile of Group A to control the generation of streams (A,1), (A,2) and (A,3), such that the streams (A,1), (A,2) and (A,3) are generated with desired coding rates and desired protection levels. The desired levels can be optimized according to user configurations for the system. For instance, if the adapter 24 determines that the packet loss rate for Group A is greater than a target loss rate for Group A and the connection profile for Group A is "best effort", the adapter 24 can cause the stream builder 22 to reduce the coding rate for the stream generated for Group A, which stream is replicated by the stream replicator 28 to generate streams (A,1), (A,2) and (A,3). In another instance, if the adapter 24 determines that the packet loss rate for Group A is greater than a target loss rate for Group A and the connection profile for Group A is "guaranteed", the adapter 24 can cause the stream builder 22 to increase the protection level for the stream generated for Group A. Additionally, due to the maximum bandwidth setting for the streams in Group A, in the other instance, the adapter 24 may also cause the stream builder 22 to decrease the coding rate for the stream generated for Group A.

Additionally, in the first example, if the adapter 24 determines that the packet loss rate for Group A is less than a target loss rate for Group A and the connection profile for Group A is "best effort", the adapter 24 can cause the stream builder 22 to increase the coding rate for the stream generated for Group A, as long as the new coding rate would not exceed the maximum bandwidth for streams in Group A. In another example, if the adapter 24 determines that the packet loss rate for Group A is less than a target loss rate for Group A and the connection profile for Group A is "guaranteed", the adapter 24 can cause the stream builder 22 to decrease the protection level for the stream generated for Group A. Additionally, based on the maximum bandwidth setting for the streams in Group A, in the other example, the adapter 24 may also cause the stream builder 22 to increase the coding rate for the streams generated for Group A.

By employing the system 2, the media data 7 can be decoded in real-time to generate the output signal at the content receiver 6, such as for broadcasting the media over another network. Additionally, by employing the path diversity (the N number of networks 16) and protection levels, interruptions in a continuous stream of data in the output signal generated by the decoder 36 at the content receiver 6 can be reduced or eliminated. Further, the adapter 24 can continuously control the generation of the streams to reflect current network conditions.

Figure 2:
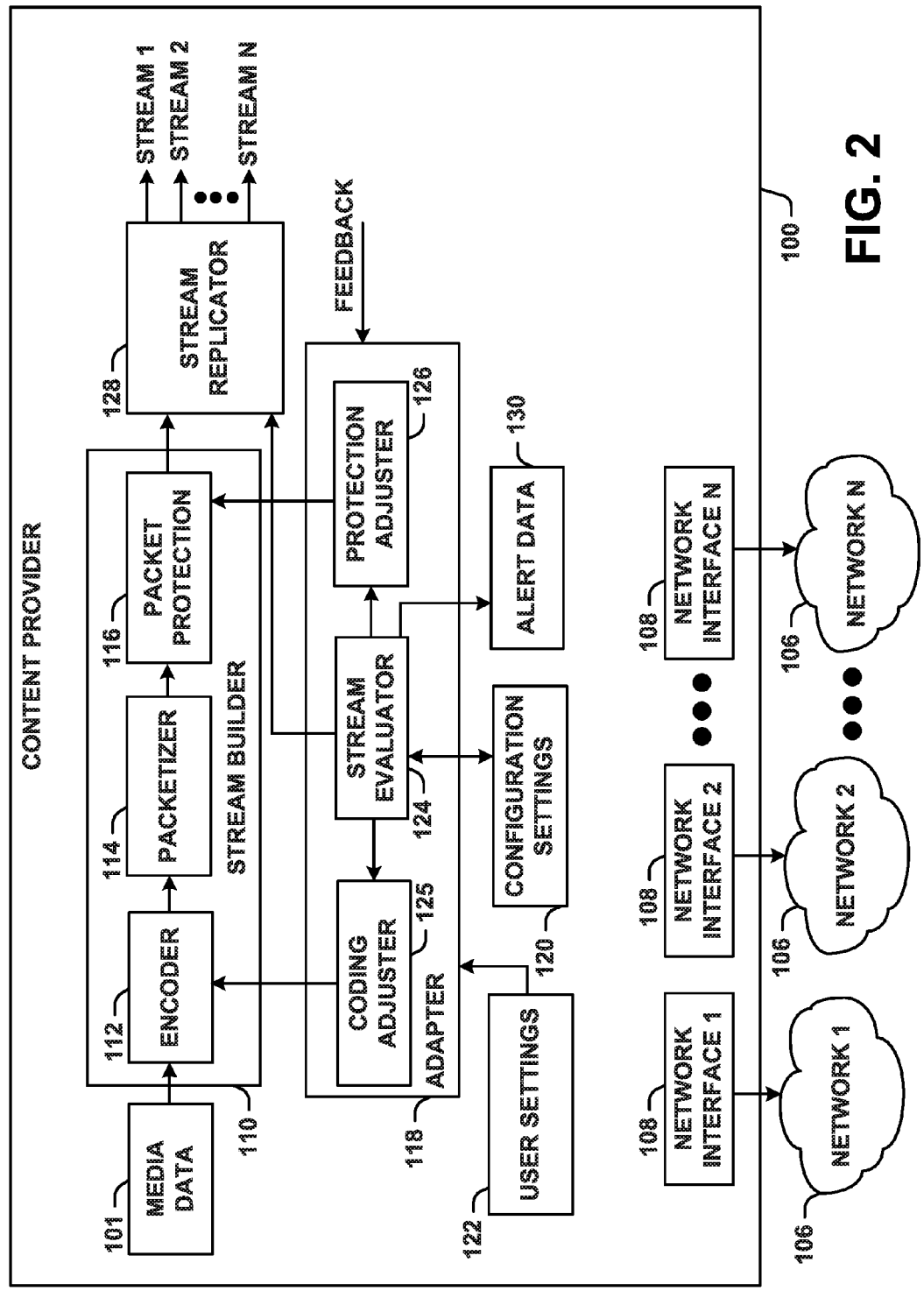
FIG. 2 illustrates an example of a content provider.

FIG. 2 illustrates an example of a content provider 100 that can be employed to implement the content provider 4 illustrated in FIG. 1. The content provider (e.g., a studio-transmitter link) 100 can transmit real-time data corresponding to media data 101 (e.g., ingested from an analog or digital input stream) to a content receiver (e.g., the content receiver 6 of FIG. 1). The content provider 100 can be implemented, for example, as a computer and/or as a system of components, such as a plurality of integrated circuit (IC) chips. In some examples, the content provider 100 can be implemented as a rack system that includes cards (e.g., electrical circuits) connected via one or more internal bus structure.

The content provider 100 can transmit real time media over N number of networks 106. The content provider can include N number of network interfaces 108 to communicate with the N number of networks 106, such that a given network interface 108 of the content provider 100 and the content receiver communicate via a corresponding network. Each of the N number of network interfaces 108 could be implemented, for example, as a local area network (LAN) bridge card (e.g., circuit), a data card or the like. Each of the N number of networks 106 can be implemented, for example, as a packet streaming network, such as a network that employs an Internet protocol (e.g., TCP/IP, IPv6 or the like) or other packet-based communications protocol. In some examples, a given network of the N number of networks 106 can be a private network with a limited number of nodes connected thereto. In such a situation, the given network of the N number of networks 106 can represent a dedicated connection between the content provider 100 and the content receiver. Additionally or alternatively, another network of the N number of networks 106 can be a public network (e.g., the Internet). Accordingly, in some examples, the content provider 100 and the content receiver can have redundant communication paths (e.g., path diversity), such that the content provider 100 and the content receiver can continue to communicate even if one of the N number of networks 106 fails.

The media data 101 that includes the real-time content to be provided from the content provider 100 to the content receiver can be stored in a memory. In other examples, the media data 101 could be a continuous or intermittent source of content (e.g., an analog input signal). In still other examples, the media data 101 could be input from an audio card of an external system. The media data 101 can be stored or provided in an uncompressed format or a compressed format (e.g., encoded format). The media data 101 can be provided to a stream builder 110 of the content provider 100. In some examples, the stream builder 110 could be implemented, for example, as an application specific integrated circuit (ASIC) chip, a microcontroller, a programmable logic IC chip (e.g., a field programmable gate array (FPGA)) or the like. The stream builder 110 can include, for example, an audio card. In other examples, the stream builder 110 could be implemented as machine readable instructions executing on a processor. The stream builder 110 can include an encoder 112 configured to employ an algorithm to encode (e.g., compress) the media data 101 at a specific coding rate into a specific encoding format. In some examples, the encoding format could be the moving pictures expert group (MPEG) layer 3 (MP3) format, the MPEG-4 format, the Advanced Audio Coding (AAC) format or the like.

Upon encoding the media data 101 into the appropriate format, a packetizer 114 of the stream builder 110 can convert the encoded media data into a stream, such as a stream of RTP packets that can be provided over an IP network by employment of user datagram protocol (UDP) packets. The stream can be provided to a packet protection component 116 that can embed error codes (e.g., FEC codes) into the stream. The amount of error codes can define a protection level, wherein a higher protection level can achieve a greater ability of packet reconstruction at a cost of increased bandwidth. Table 5 includes an example list of protection levels and a corresponding FEC matrix employed for packet reconstruction and an overhead percentage added for an associated protection level.

TABLE 4

| Protection Level | Matrix Type | Overhead percentage |
| --- | --- | --- |
| 0 | None | None |
| 1 | 2 × 10 (Column only FEC) | 10 |
| 2 | 4 × 4 (Column Only FEC) | 25 |
| 3 | 4 × 4 (Column and Row FEC) | 50 |
| 4 | 3 × 3 (Column and Row FEC) | 67 |
| 5 | 2 × 3 (Column and Row FEC) | 84 |
| 6 | 2 × 2 (Column and Row FEC) | 100 |

Figure 3:
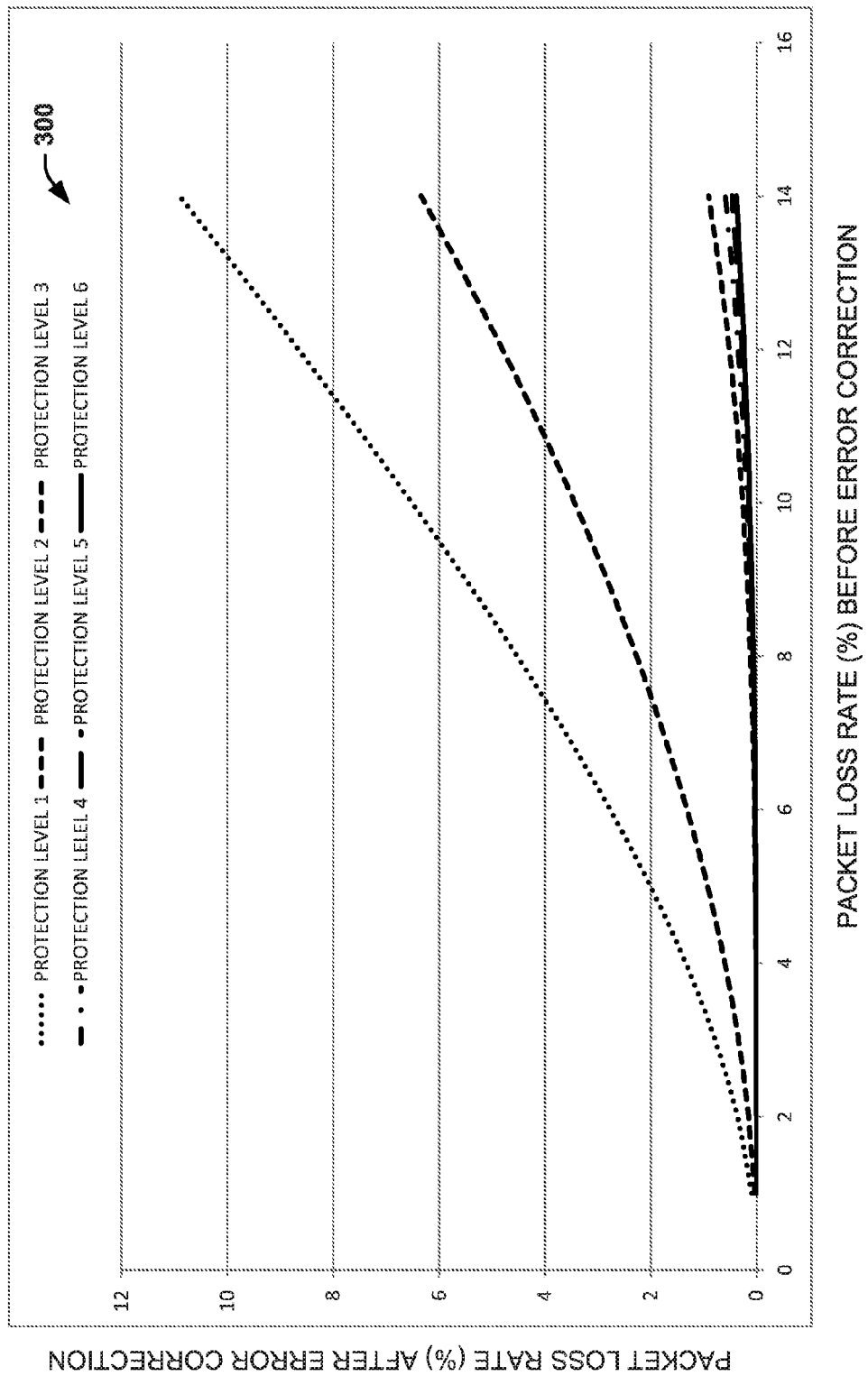
FIG. 3 illustrates an example graph that plots a packet loss rate after error correction as a function of packet loss rate before error correction.

FIG. 3 illustrates an example of a graph 150 that plots a packet loss rate in percentage (%) after error correction is employed for a given stream (or group of streams) as a function of a packet loss rate in percentage (%) before the error correction is employed for the given stream (or group of streams) for the protection levels 1-6 included in Table 4. As is illustrated, a significant reduction in the packet loss rate can be achieved by the employment of error correction codes.

Returning to FIG. 2, the encoder 112 and the packet protection component 116 of the stream builder 110 can be controlled by an adapter 118. In some examples, the adapter 118 could be implemented, for example, as an ASIC chip, a microcontroller, a programmable logic IC chip or the like. In other examples, the adapter 118 could be implemented as machine readable instructions executing on a processor. The adapter 118 can read and edit configuration settings 120 that can control, for example, the coding rate of one or more streams output by the stream builder 110. The configuration settings 120 can be edited by a stream evaluator 124 of the adapter 118. The configuration settings 120 can be based on user settings 122 that can be set in response to user input via a GUI. Additionally, the configuration settings 120 can be based on a feedback signal (labeled in FIG. 2 as "FEED-BACK") that can be provided from the content provider 100. The configuration settings 120 and the user settings 122 could be stored, for example, in a memory.

The user settings 122 can characterize initial settings for each stream generated by the stream builder 110. The initial settings can be stored by the adapter 118 in the configuration settings 120. The user settings 122 can be employed by the adapter 118 to control the stream builder 110. Examples of the user settings 122 are included in Table 5, which is a superset of Table 1. The user settings 122 included in Table 5 is not meant to be exhaustive. Instead, Table 5 includes examples of user settings 122 that could be employed by the adapter 118.

TABLE 5

| ELEMENT | DESCRIPTION |
| --- | --- |
| Network Output | Identity of network to output stream |
| Group ID | Each stream is assigned a group. Multiple streams belonging to the same group share the same media payload (e.g., same codec/coding rate) and the same protection level. |
| Maximum Bandwidth | Each stream is assigned maximum overall bandwidth, which includes both source coding rate and protection level. Streams belonging to the same group have same settings. |
| Target Packet Loss Rate | Packet loss rate to achieve for a Group |
| Protection Reversion Duration | Continuous duration of time to wait before the current loss rate is less than target packet loss rate before attempting a protection level reduction. |
| Maximum Protection Failed Attempts | Maximum number of failures at a protection level before the protection level is marked as a minium protection level. |
| Packet Loss Calculation Interval | Interval to calculate packet loss rate for the group. |
| Minimum Protection Level | Minimum protection level to apply to the group. |
| Minimum Coding Rate | Minimum acceptable encoding rate. |
| Connection Profile | Best effort, Guaranteed. In a Best effort connection profile the packet loss is assumed to be due to congestion, which will vary the total stream bandwidth by reducing the coding rate while keeping the protection level fixed. In a Guaranteed profile, the packet loss rate is assumed to be non-congestive and therefore the protection level is varied along with the coding rate to keep the overall stream bandwidth at the maximum rate. |

The stream evaluator 124 can determine a current coding rate and a current protection level for each stream generated by the stream builder 110 based on the user settings 122 and the feedback signal (e.g., containing packet loss information from a receiver of each respective stream). The adapter 118 can include a coding adjuster 125 that can set a current coding rate of the encoder 112 in response to a signal from the stream evaluator 124. The adapter 118 can also include a protection adjuster 126 to set a current protection level set by the packet protection component 116 in response to a signal from the stream evaluator 124. In some examples, the stream evaluator 124 can signal the coding adjuster 125 to cause the encoder 112 to generate multiple streams with different coding rates for the same media data 101. In such a situation, the multiple streams can be encoded with the same encoding format or different encoding formats.

As one example, a given stream for the media data 101 can be generated by the stream builder 110 that has a current protection level set to the minimum protection level specified in the user settings 122 and a coding rate that is set based on the maximum bandwidth set in the user settings 122 and on the current protection level of the stream. Additionally, a group ID and a forwarding entry of the stream can be included in the given stream.

The given stream can be provided to a stream replicator 128. In some examples, the stream replicator 128 could be implemented, for example, as an ASIC chip, a microcontroller, a programmable logic IC chip or the like. The stream replicator 128 could include, for example, a data card. In other examples, stream replicator 128 could be implemented as machine readable instructions executing on a processor. The stream replicator 128 can be controlled by the stream evaluator 124 of the adapter 118. The stream replicator 128 can generate multiple copies (e.g., duplicates) of the given stream and output each of the multiple copies (labeled in FIG. 2 as STREAMS 1-N) of the stream to the N network interfaces 108, or some subset thereof. For instance, if the user settings 122 indicate that the given stream and another stream have the same Group ID, then the given stream and the other stream have the same coding rate and the same protection level. In such a situation, the stream evaluator 124 can signal the protection adjuster 126 to cause the stream replicator 128 to generate a duplicate of the given stream, which duplicate is the other stream. The given stream can be provided to the network interface 1, while the other stream can be provided to the network interface 2, for example.

Additionally or alternatively, based on the user settings 122, multiple streams can be generated for the media data 101 that have different Group IDs. For example, a given stream can have a given Group ID and another stream can have another Group ID, wherein the given and the other stream have different coding rates for the media data 101. In such a situation, the given and the another streams can be provided to the network interface 1 and network interface 2, respectively and transmitted to the content receiver via networks 1 and 2 of the N number of networks 106. It is noted that in some examples, both the given and/or the other stream can be replicated by the stream replicator 128 in the manner described herein.

By way of illustration, to facilitate understanding of the content provider 100, a second example is given (hereinafter, "the second example"). In the second example, the stream builder 110 can generate a different number of streams for each of two different groups of streams Group A and Group B, wherein each stream in a group of streams is provided over a different network of the N number of networks 106. Table 6 summarizes the streams in the second example.

TABLE 6

|  | GROUP A | GROUP B |
| --- | --- | --- |
| STREAM 1 | YES | YES |
| STREAM 2 | YES | YES |
| STREAM 3 | YES | NO |

Accordingly, as illustrated in Table 6, Group A has three streams and Group B as two streams. Thus, each stream can be identified by a group and a stream number. For instance, the first stream (stream 1) in Group A can be identified as stream (A,1). Table 7 illustrates initial settings of each of the streams in the second example.

TABLE 7

|  | CURRENT ENCODING RATE | CURRENT PROTECTION LEVEL | NETWORK ENTRY |
| --- | --- | --- | --- |
| STREAM (A, 1) | 128 kbit/s | 3 | 1 |
| STREAM (A, 2) | 128 kbit/s | 3 | 2 |
| STREAM (A, 3) | 128 kbit/s | 3 | 3 |
| STREAM (B, 1) | 756 kbit/s | 2 | 1 |
| STREAM (B, 2) | 756 kbit/s | 2 | 2 |

Each of the streams in Groups A and B in the second example can be provided to the content receiver via their respective networks 106. Additionally, at intervals defined by the packet loss calculation interval of the user settings 122, the stream evaluator 124 can provide a request for a packet loss update (e.g., a request for the feedback signal) to the content receiver. In response, the feedback signal from the content receiver can be received at the stream evaluator 124. In the second example, the feedback signal can include data characterizing a packet loss rate and a loss profile for both of the Groups A and B. For purposes of simplification of explanation, only data characterizing the packet loss rate and the loss profile of Group A is explained below, but the data characterizing the packet loss rate and the loss profile of Group B can be processed in a similar manner.

In the second example, the stream evaluator 124 can employ the data characterizing the packet loss rate and the loss profile of Group A to control the coding adjuster 125 and the protection adjuster 126 such that the streams (A,1), (A,2) and (A,3) are generated by the stream builder 110 with desired coding rates and desired protection levels (e.g., optimized per user configuration and system requirements). The evaluator 124 can employ logic to make the determination as to whether to increase or decrease the coding rate and/or the protection level of the stream generated by the stream builder 110 for Group A. The determination can be based, for example, on the initial settings of the streams of Group A and the user settings 122. For example, such user settings 122 can include the minimum coding rate, the target loss rate, the protection revision duration, the connection profile, the minimum protection level, the maximum protection failed attempt and the maximum bandwidth.

Moreover, in some examples, due to constraints defined in the user settings 122, the stream evaluator 124 may determine that the protection level cannot be increased and/or the coding rate cannot be decreased. Stated differently, in some instances a determined optimal coding rate and/or an optimal protection level would violate a setting of the user settings 122. In such a situation, the stream evaluator 124 can generate alert data 130 that can be output to a user (e.g., via a GUI) to inform the user that the user settings 122 may need to be changed based on network conditions. The alert data 130 could be stored in a memory. Additionally or alternatively, based on the loss profile in the feedback signal, the stream evaluator 124 can determine that the streams of Group A should implement interleaving. For example, the stream evaluator 124 can provide a command signal to the protection adjuster 126 to cause the packet protection to implement interleaving for streams of Group A. An example of an algorithm that can be employed to by the adapter 118, including the stream evaluator 124, is illustrated as a flowchart in FIGS. 5A-5E.

Figure 4:
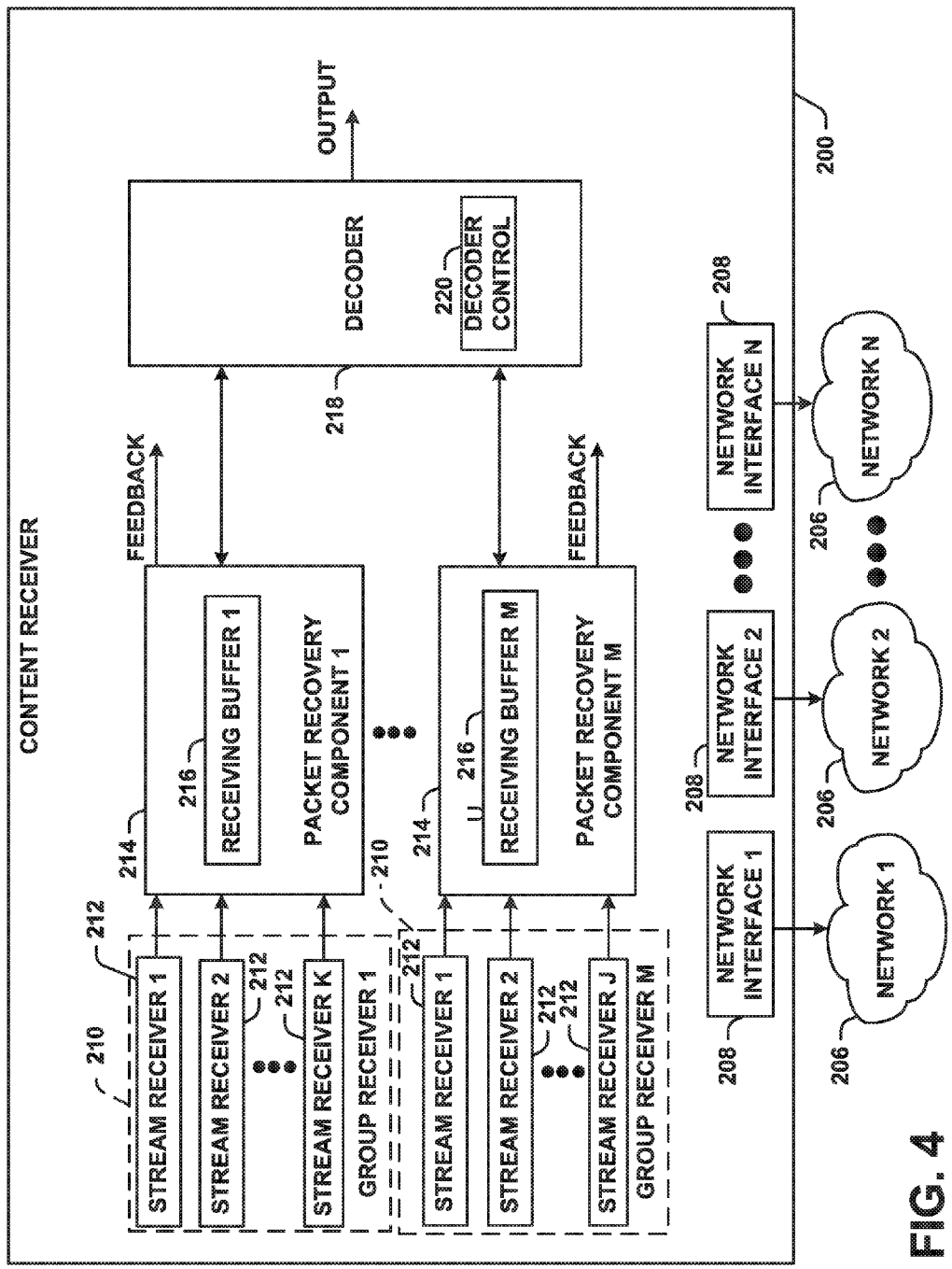
FIG. 4 illustrates an example of a content receiver.

FIG. 4 illustrates an example of a content receiver 200 that can be employed to implement the content receiver 6 illustrated in FIG. 1. The content receiver 200 can be employed to receive real-time data corresponding to media data (e.g., a media file) provided from a content provider, such as the content provider 4 illustrated in FIG. 1 and/or the content provider 100 illustrated in FIG. 2. In some examples, the content receiver 200 can be implemented, for example, in a broadcast system that receives the real-time data and provide a corresponding output (e.g., a video and/or an audio signal) to end-user devices, such as televisions or radios. In other examples, the content receiver 200 can be implemented at an end user device, such as an end-user computer (e.g., a tablet computer, a desktop computer, a laptop computer or the like), a set-top box, a digital radio (e.g., a satellite radio) or the like.

The content receiver 200 can be implemented, for example, as a computer and/or a system of electrical components. In some examples, the content receiver 200 can be implemented as a rack system that includes cards (e.g., containing electrical circuits, integrated circuits and/or discrete components) connected via a data bus. In addition, to including transmission circuitry for broadcasting media received from the content provider, the receiver 200 can also include a transmitter-to-studio link for providing feedback to the content provider, as disclosed herein. The link can be provided in the broadcast or a separate link can be utilized for communicating the feedback information to the content provider.

The content receiver 200 can communicate over N number of networks 206. The content receiver 200 can include N number of network interfaces 208 to communicate with the N number of networks 206, such that a given network interface 208 of the content receiver 200 and the content receiver 200 can communicate via a corresponding network. Each of the N number of network interfaces 208 could be implemented, for example, as a LAN bridge card, a data card or other communications interface. Each of the N number of networks 206 can be implemented, for example, as a packet streaming network, such as a network that employs the Internet protocol (e.g., TCP/IP, IPv6 or the like). In some examples, a given network 206 of the N number of networks 206 can be a private network with a limited number of nodes connected thereto. In such a situation, the given network of the N number of networks 206 can represent a dedicated connection between the content provider and the content receiver 200. Additionally or alternatively, another network 206 of the N number of networks 206 can be a public network (e.g., the Internet). Accordingly, in some examples, the content receiver 200 and the content provider can have redundant communication paths (e.g., path diversity), such that the content receiver 200 and the content provider can communicate even if one of the N number of networks 206 fails.

Continuing with the second example, streams (A,1), (A,2), (A,3), (B1) and (B,2) can be provided over the network 206 identified in the network entry of the initial settings of the streams (Table 7). The content receiver 200 can receive each stream via the N number of network interfaces 208 of the content receiver 200. The content receiver 200 can include M number of group receivers 210, where M is an integer greater than or equal to two. Each of the M number of group receivers 210 can include a plurality of stream receivers 212 to receive each stream that has the same Group ID. In some examples, each of the stream receivers 212 can be implemented, for example, as an ASIC chip, a microcontroller, a programmable logic IC chip or the like. Each of the stream receivers 212 can include, for example, a data card. In other examples, each of the stream receivers 212 could be implemented as machine readable instructions executing on a processor.

In the second example, the group receiver 1 can include K number of stream receivers 212, where K is an integer greater than or equal to one. Each stream of the K number of stream receivers 212 can be configured to receive a corresponding stream in Group A. Thus, the group receiver 1 via the K number of stream receivers 212 can receive streams (A,1), (A,2) and (A,3), which can be received at network interfaces 1, 2 and 3, respectively of the content receiver 200. Each of the K number of stream receivers 212 can provide each of the streams in Group A to a first of M number of packet recovery components 214 (packet recovery component 1) of the content receiver 200. In some examples, each of the M number of packet recovery components 214 could be implemented, for example, as an ASIC chip, a microcontroller, a programmable logic IC chip or the like. Each of the M number of packet recovery components 214 can include, for example, an audio card. In other examples, each of M number of packet recovery components 214 could be implemented as machine readable instructions executing on a processor.

In the second example, each packet in each stream of Group A has the same coding rate and compression format and is encoding the same media data. Accordingly, each stream in Group A has packets with the same sequence number. Moreover, each packet with the same sequence number in Group A has a payload that contains a same time slice of the media data. Accordingly, the packet recovery component 1 can store a sequence of packets in a receiving buffer 216 (e.g., a jitter buffer), wherein each of the stored sequence of packets corresponds to a different time slice of the media data. For instance, if no packets are lost, the packet recovery component 1 can select a packet with a given sequence number from stream receiver 1, 2 or 3 of Group A to store in the receiving buffer 216 and the other two packets with the given sequence number can be discarded since they contain redundant information. In another example, if only one packet is received that includes the given sequence number, that packet can be stored in the receiving buffer 216 of the packet recovery component 1. In yet another example, if none of the streams has the given sequence number, the packet corresponding to the given sequence number can be marked as "lost" by the packet recovery component 1. Moreover, in such a situation the packet recovery component 1 can attempt to reconstruct the packet with the given sequence number by employing embedded error correction codes of streams in Group A, such as where the communications protocol (e.g., UDP) does not provide for retransmission of lost packets.

If the packet with a given sequence number cannot be reconstructed, the receiving buffer 216 of packet recovery component 1 can store an empty packet with a given sequence number with data that characterizes the packet "unavailable". Accordingly, by providing the two or more streams over multiple different networks 206 (networks 1, 2 and 3), the resultant path diversity reduces the chance that a packet with a particular sequence number will be unavailable. Moreover, the chance that a packet with a particular sequence number will be unavailable is further reduced by the inclusion of error codes that are defined by the protection level of each stream in Group A.

The packet recovery component 1 can calculate a packet loss rate for Group A that can correspond to a number of packets that are marked as "lost" in a given period of time. The packet recovery component 1 can generate a feedback signal (labeled in FIG. 1 as "FEEDBACK") that can be provided to the content provider via one (or more) of the N number of networks 206. The feedback signal can include a group packet loss report that can include data that characterizes the packet loss rate for Group A. The packet loss rate of the packets in the group can correspond to the number of packets that are marked as "lost" in a given period of time. The feedback signal can also include a loss profile that indicates whether a burst of packets (e.g., a sequence of packets with consecutive sequence numbers) has been lost or whether the lost packets are random (e.g., packet loss occurs intermittently). In some examples, the feedback signal can be provided asynchronously. In other examples, the feedback signal can be provided in response to a packet loss update request provided from the content provider.

Additionally, in the second example, the group receiver 2 (e.g., which can be implemented as group receiver M in FIG. 4) can include J number of stream receivers 212, where J is an integer greater than or equal to one. The group receiver 2 can provide each of the streams of Group B's packet recovery component 2 (which can be implemented as packet recovery component M of FIG. 4), which can store packets in a second receiving buffer 216 (which can be implemented as receiving buffer M in FIG. 4) in a manner similar to the storage of packets in Group A into receiving buffer 1. Moreover, the packet recovery component 2 can generate a feedback signal characterizing a packet loss rate and a loss profile for the streams of Group B, namely stream (B,1) and (B,2). In some examples, the feedback signal from the packet recovery component 1 can be combined with the feedback signal from the packet recovery component 2 and provided to the content receiver 200. In other examples, the feedback signal from the packet recovery component 1 can be provided to the content provider separately from the feedback signal from the packet recovery component 2.

In the second example, a decoder 218 that can include a decoder control 220 that can examine the receiving buffers 1 and 2 to determine which receiving buffer 216 stores packets with the highest coding rate. In the present example, the receiving buffer 2 that stores packets from the stream in Group B will have the highest coding rate (768 Kbits/s). The decoder control 220 can be configured to cause the decoder 218 to drain the receiving buffer 216 with the highest coding rate and generate an output signal (labeled in FIG. 4 as "OUTPUT") that represents a decoded version of the media data. In some examples, the decoder 218 could be implemented, for example, as an ASIC chip, a microcontroller, a programmable logic IC chip or the like. The decoder 218 can include, for example, a decoder card configured to assemble and decode the stream for subsequent distribution (e.g., broadcast). In other examples, the decoder 218 could be implemented as machine readable instructions executing on a processor.

Moreover, as noted, a given packet in the receiving buffer 216 with the highest coding rate may be labeled as "unavailable". In such a situation, the decoder 218 can be configured to drain a packet corresponding to the given packet from a receiving buffer 216 with the next highest coding rate, which in the second example would be receiving buffer 1, which stores packets from the streams in Group A. In such a situation, the decoder control 220 can be configured cause the decoder 218 to drain and decode the packet from Group A with a lower coding rate and then return to the draining and decoding of the packets stored in the receiving buffer 2 from the stream and Group B with the highest coding rate. In this manner, the streams in the group with the highest coding rate that are reliably received can be decoded, such that a relatively high quality regeneration of the real time media data stream can be provided as the OUTPUT.

Furthermore, in some situations of the second example, the streams in Group A and the streams in Group B can be encoded with the same algorithm, such that a switch between draining and decoding packets from the two groups of streams can be "hitless" since each packet would contain a common time slice of the media data encoded at different coding rates. In such a situation, a payload of the packets of streams in Group A would be different (e.g., less) that a payload of the packets of Group B, but there would be the same number of packets in the streams of Group A and the streams of Group B.

In other situations of the second example, the streams in Group A and the streams in Group B can be encoded with different algorithms. In such a situation, the decoder control 220 can select a group with streams that have the highest coding rate (Group B) as an "active" group and select a group (or groups) with a lower coding rate (and encoded with different algorithms) as a "standby" group. In this example, the receiving buffer of the active group (e.g., receiving buffer 2) is drained and decoded by the decoder 218. Additionally, at or near a time that the feedback signal is provided to the content provider, the decoder control 220 (e.g., via a background process) can evaluate the packet loss rate and determine that a switch between the active group and the standby group is desirable.

The determination to switch between the active group and the standby group can be based for example, on the packet loss rate, a coding rate and an encoding format for each group of streams. For instance, in the second example, if the decoder 220 determines that Group A has a packet loss rate lower than a target packet loss rate Group A, and the decoder control 220 determines that Group B has a target packet loss rate greater than a target packet loss rate for Group B, the decoder 220 could determine that it is desirable to select Group A as the active group and select Group B as the standby group. Moreover, if the both Group A and Group B have packet loss rates greater than the corresponding target packet loss rates, the decoder 220 could select the group with the lowest deviation from the corresponding target loss rate as the active group and the group with the higher deviation from the corresponding target loss rate as the standby group. However, if both Group A and Group B have packet loss rates greater than the corresponding target packet loss rates and both Group A and Group B have a packet loss rate that equally (or about equally) deviate from the corresponding target packet loss rates, the decoder 220 could select the active group based on a combination of an encoding format and a coding rate for each group. In one instance where both Group A and Group B have packet loss rates greater than the corresponding target packet loss rates and both Group A and Group B have a packet loss rate that equally (or about equally) deviate from the corresponding target packet loss rates, the decoder 220 could select with the group with the highest coding rate as the active group and the group with the lower coding rate as the standby group. Further still, in some examples, if a first group of streams and a second group of streams have packet loss rates greater than corresponding packet target loss rates, both the first and second group have a packet loss rate that equally (or about equally) deviate from the corresponding target packet loss rates and the first and second group of streams have the same (or nearly the same) coding rate, the decoder 220 could select the group with a particular encoding format as the active group, since some encoding formats could have preferential features.

Figure 6A:
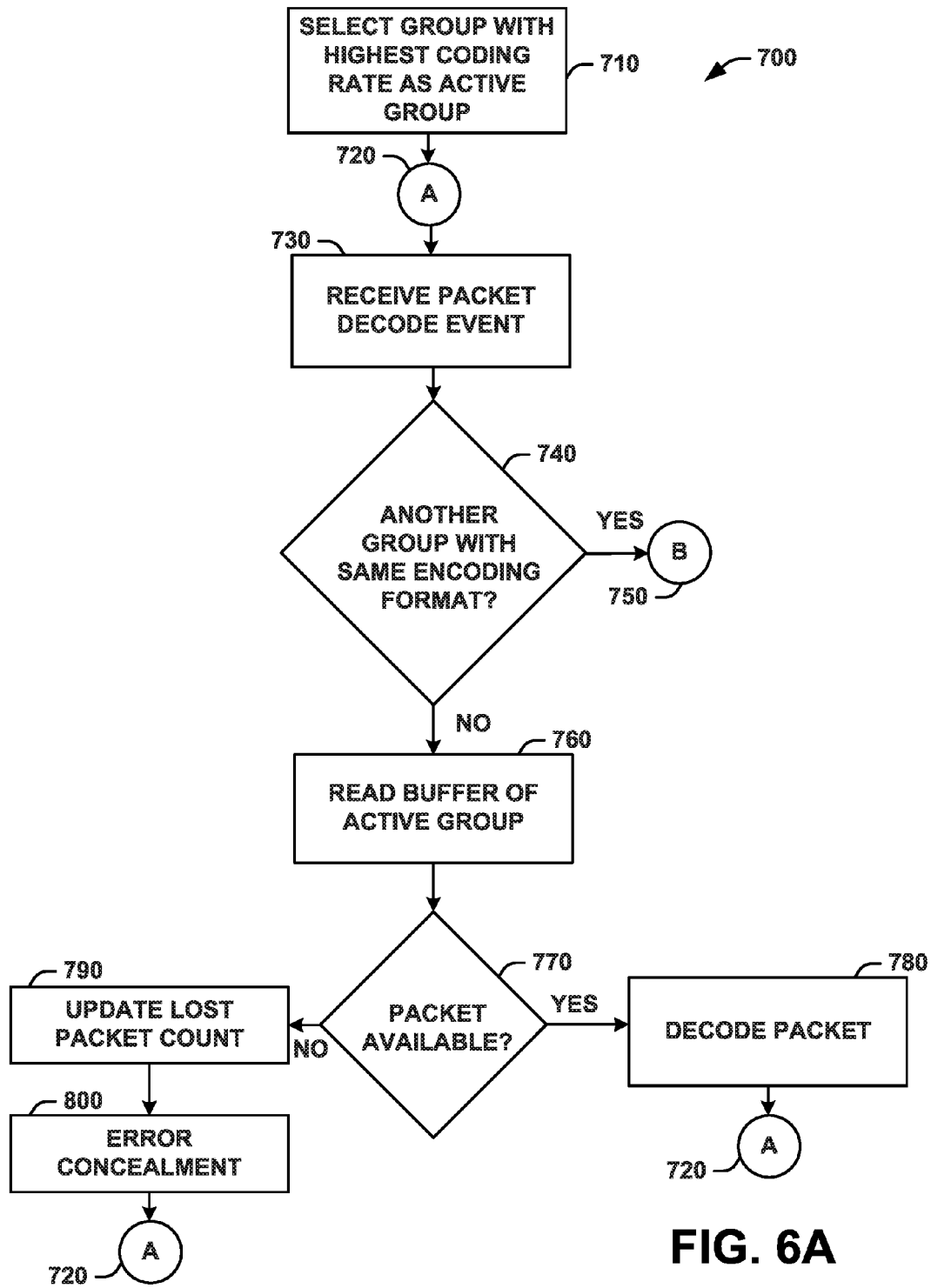
FIGS. 6A-6B illustrate a flowchart of an example method for decoding media data.
Figure 6B:
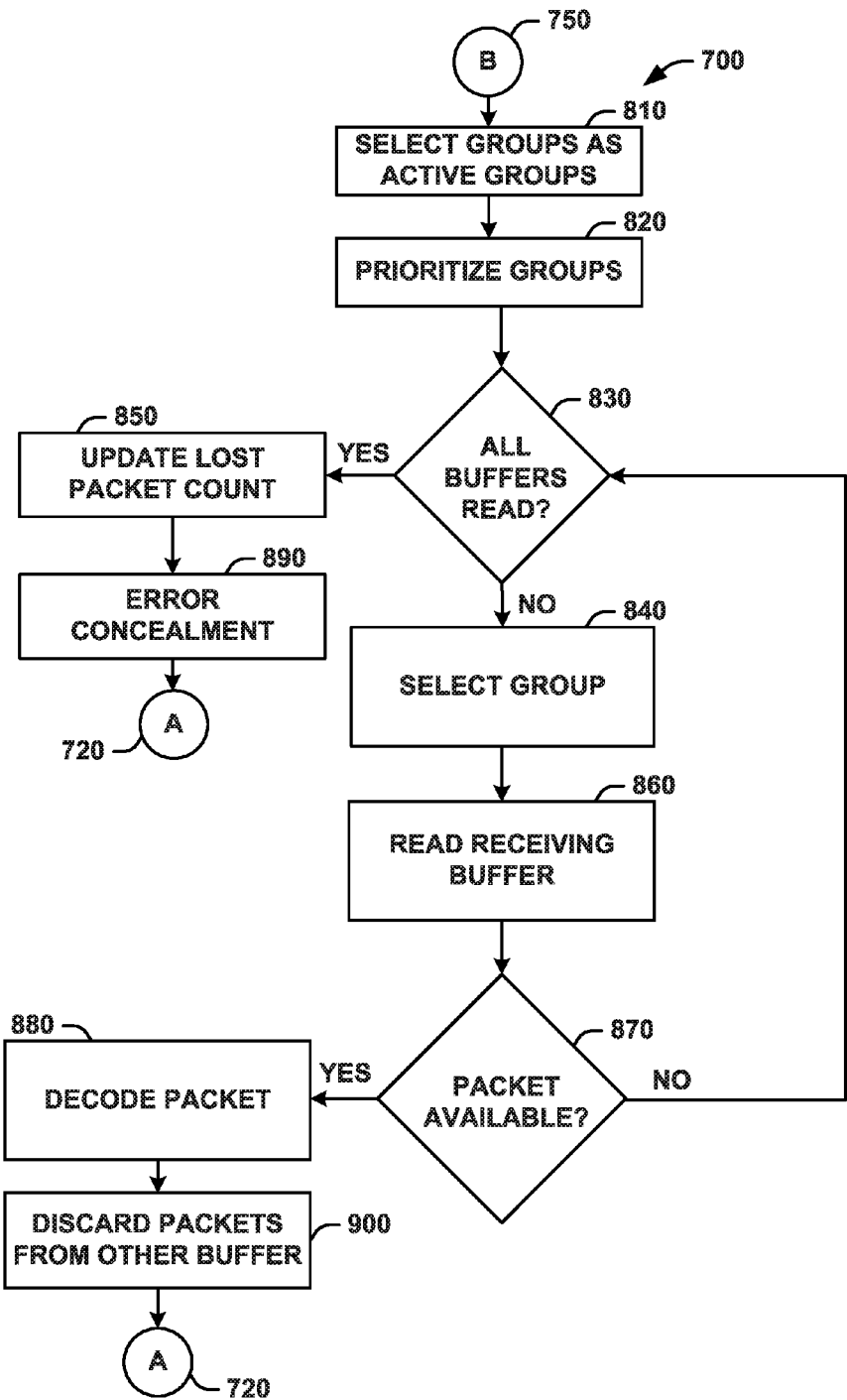

In the second example, if the decoder control 220 determines that a switch between the active group and the standby group is desirable the decoder control 220 can select Group B as the active group as select Group A as the standby group. Additionally, the decoder control 220 can induce a delay in the output signal to account for different time slices of the media data being encoded into the streams of Groups A and B. Moreover, since the switch between the active group and the standby group occurs at or near a time that the feedback signal is provided to the content provider, the resultant switching process has hysteresis so as to avoid inducing excessive amounts of delay into the output signal. An example of an algorithm that can be employed to by the decoder control 220 and the M number of packet recovery components 214 is illustrated in FIGS. 6A-6B.

In view of the foregoing structural and functional features described above, example methods will be better appreciated with reference to FIGS. 5A-5E, 6A-6B and 8. While, for purposes of simplicity of explanation, the example methods of FIGS. 5A-5E, 5A-5B and 8 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example methods of FIGS. 5A-5E, 5A-5B and 8 can be implemented as instructions stored in a non-transitory machine-readable medium. The instructions can be accessed by a processing resource and executed to perform the methods disclosed herein. In other examples, as disclosed herein, the respective methods can be implemented by corresponding hardware components or a combination of hardware and software/firmware.

FIGS. 5A-5E illustrate a flow chart of an example method 300 for controlling a protection level and a coding rate of a stream. The method 300 could be executed, for example, by an adapter (e.g., the adapter 24 illustrated in FIG. 1 and/or the adapter 118 illustrated in FIG. 2). At 310, a stream evaluator (e.g., the stream evaluator 124 illustrated in FIG. 2) can set initial stream settings for a given stream of media data. The initial stream settings can be based, for example, on user settings, such as the user settings included in Table 5. The initial settings can be stored, for example, as configuration settings (e.g., the configuration settings 120 illustrated in FIG. 2). The given stream could be, for example, a single stream of a Group of streams, such as stream (A,1) in the second example. At 320, the method 300 proceeds to 330. At 330, a feedback signal can be received at the stream evaluator that can characterize a packet loss rate and a loss profile of the given stream. At 340, a determination can be made by the stream evaluator as to whether the packet loss rate reported in the feedback signal is greater than or equal to a target loss rate of the user settings. If the determination at 340 is positive (e.g., YES), the method 300 can proceed to 350. If the determination at 350 is negative (e.g., NO), the method 300 can proceed to 360.

Figure 5A:
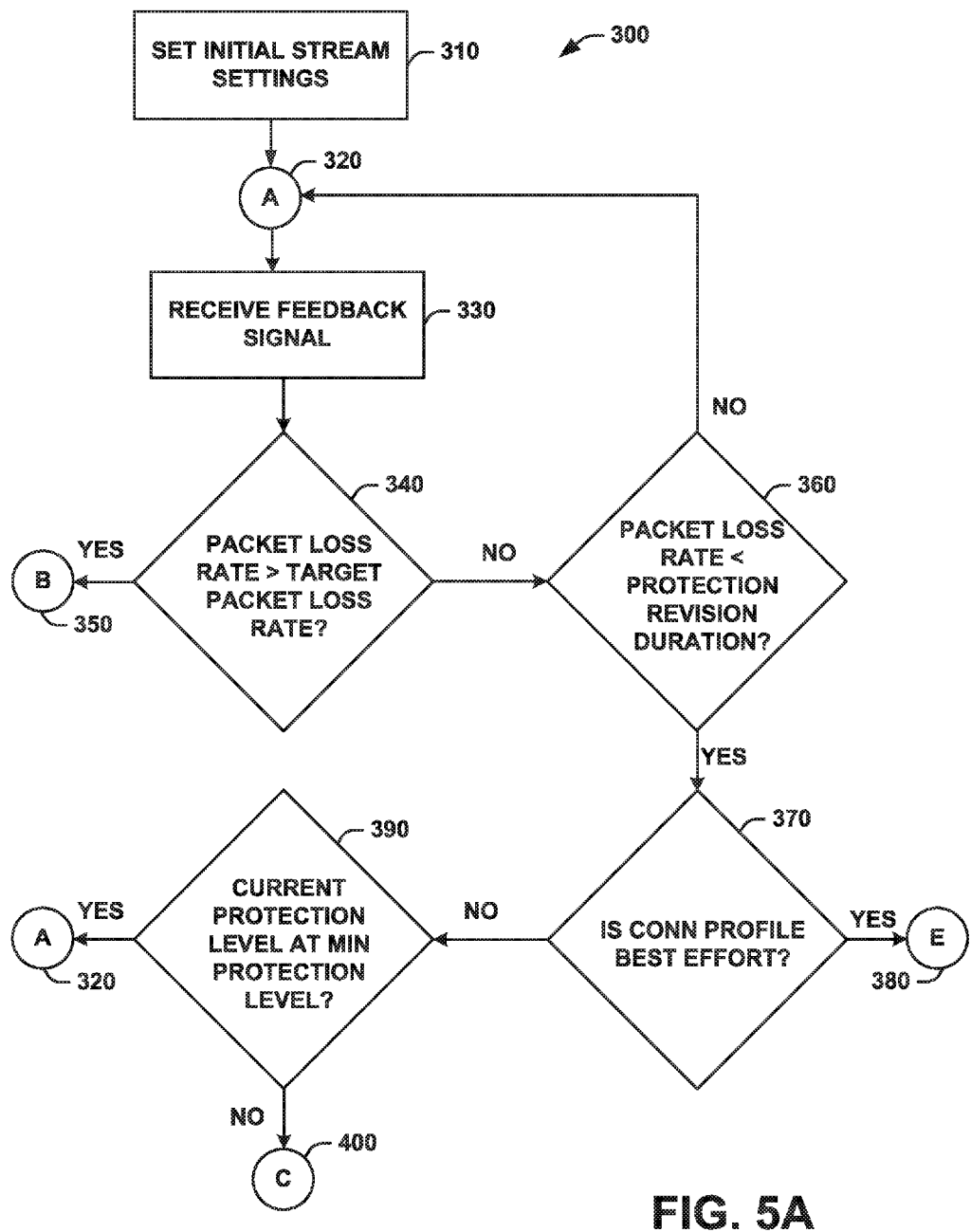
FIGS. 5A-5E illustrate a flowchart of an example method for controlling a protection level and a coding rate of a stream.
Figure 5B:
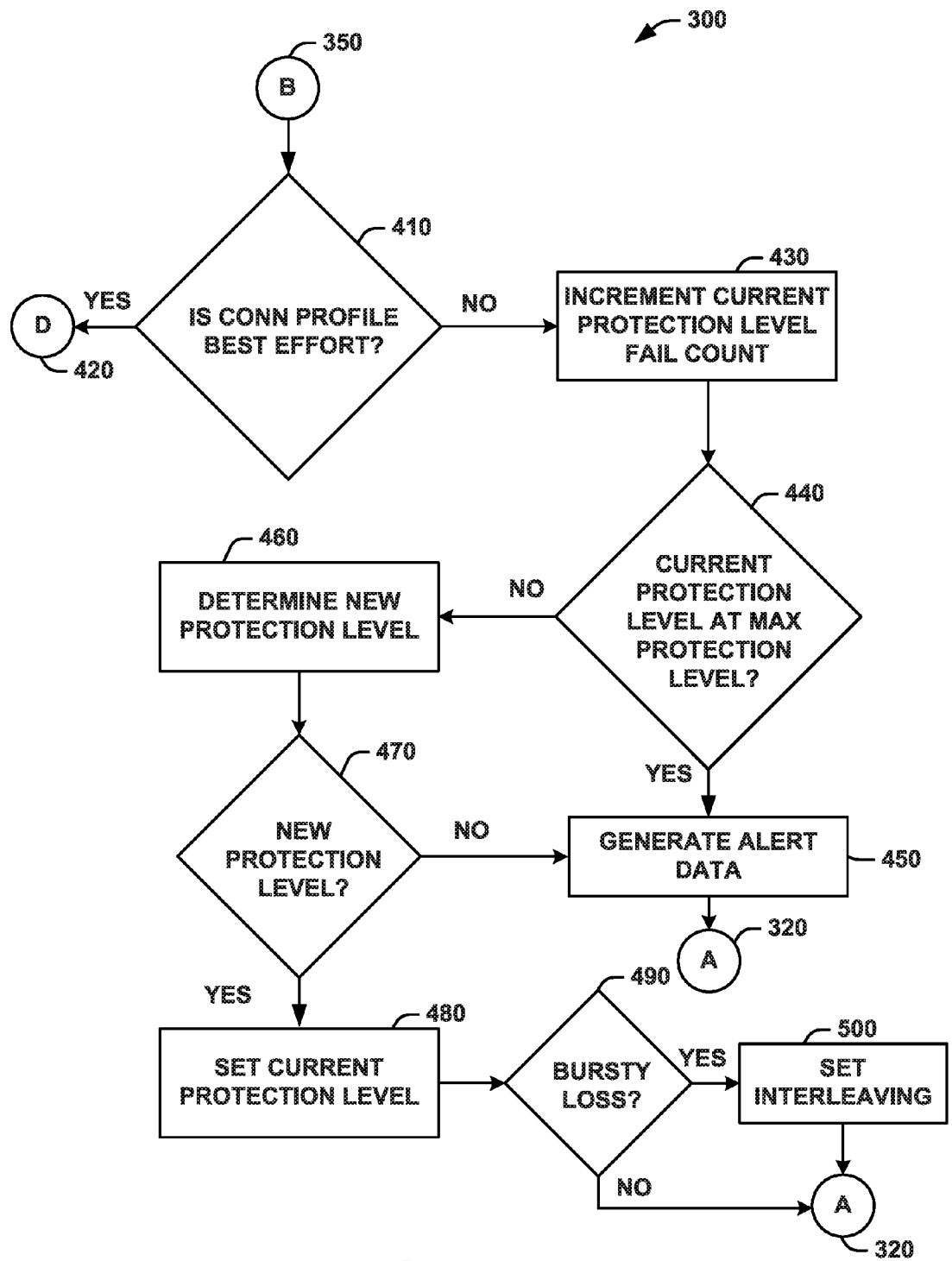
Figure 5C:
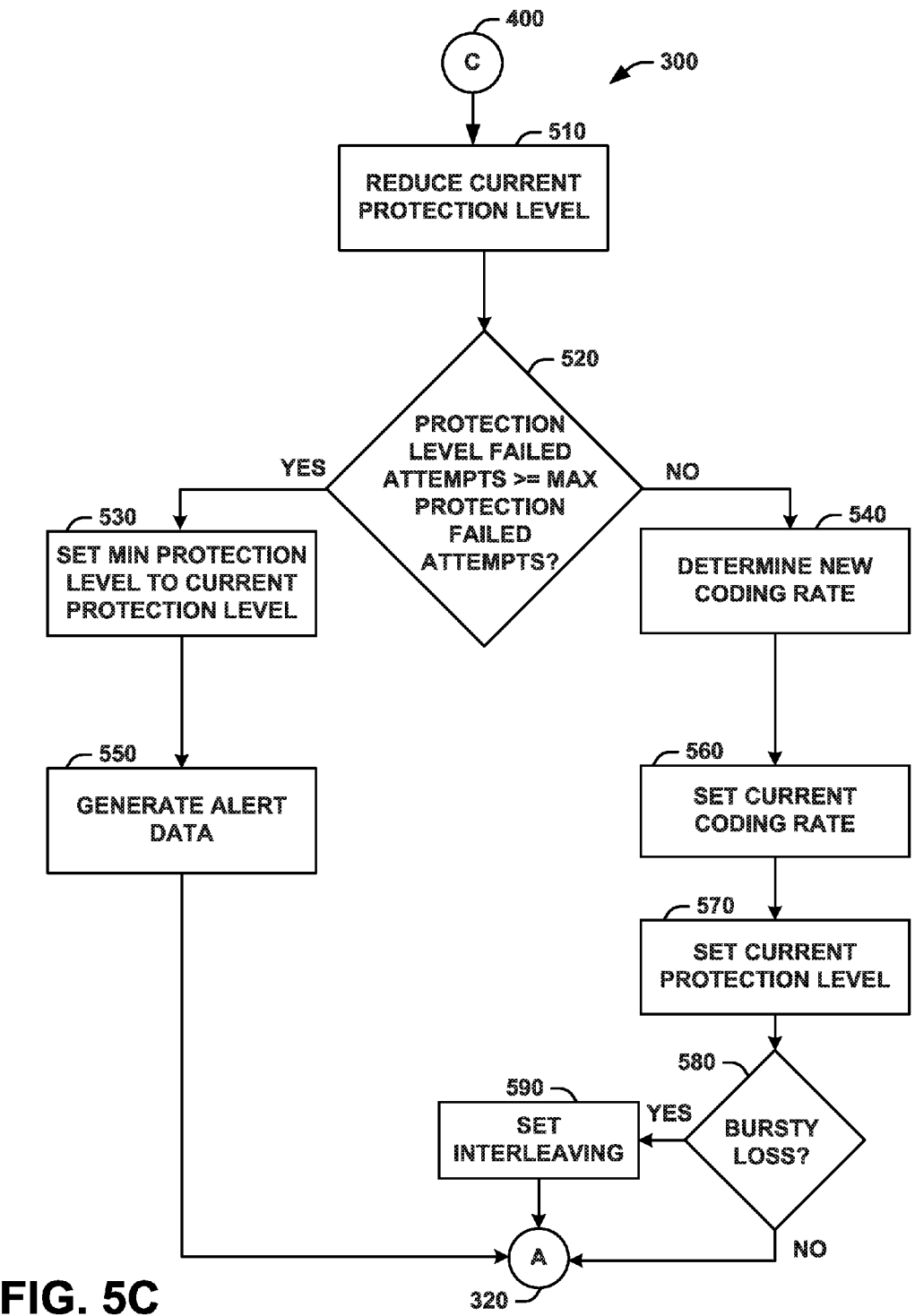
Figure 5D:
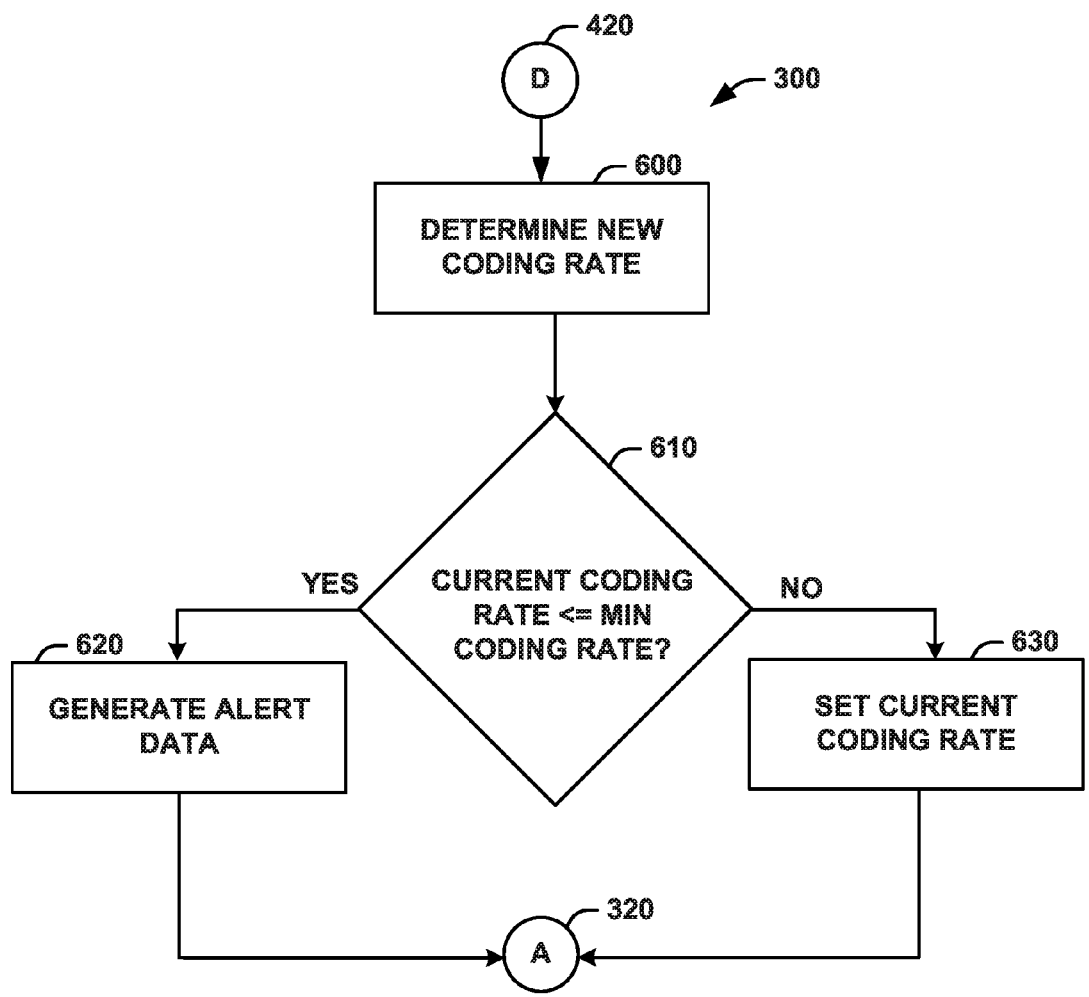
Figure 5E:
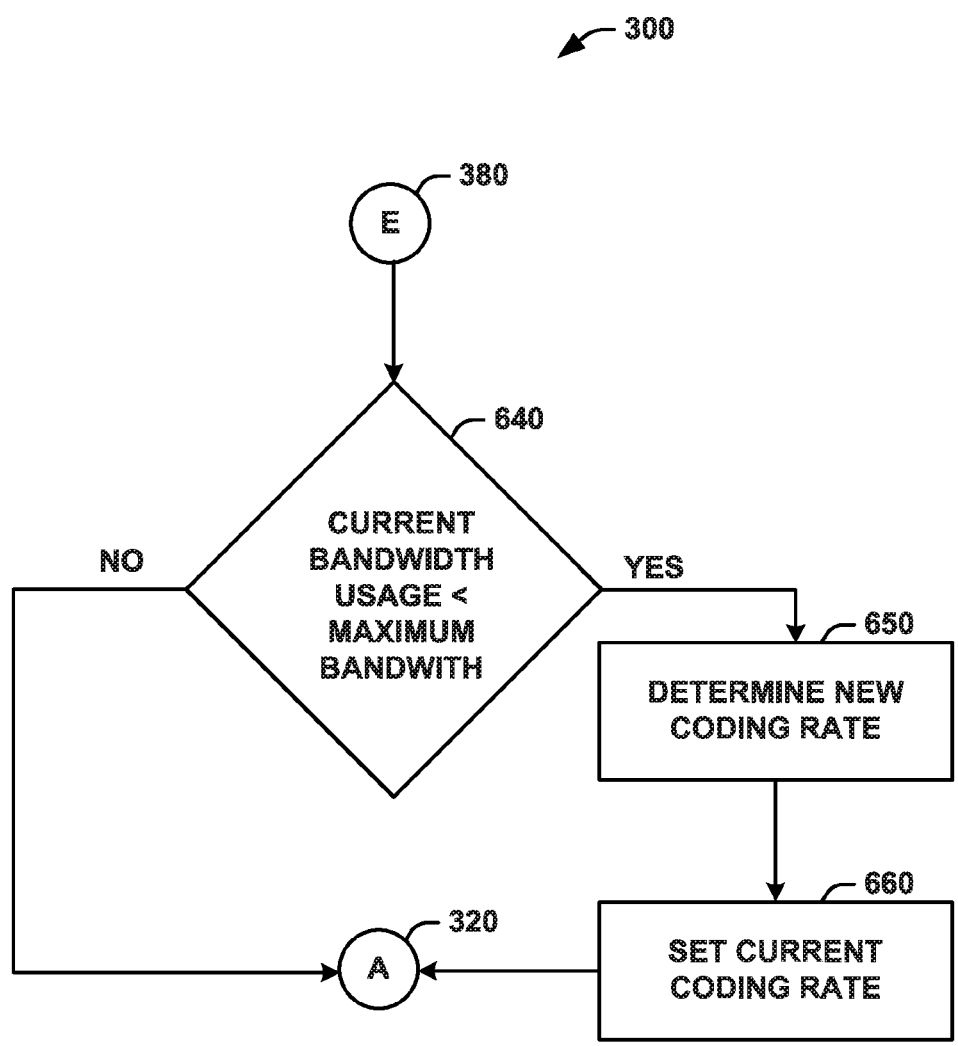

At 360, a determination can be made by the stream evaluator (e.g., stream evaluator 124 of FIG. 2) as to whether the packet loss reported in the feedback signal is less than a protection revision duration of the user settings. If the determination at 360 is positive (e.g., YES), the method 300 can proceed to 370. If the determination at 360 is negative (e.g., NO), the method 300 can return to 320. At 370, a determination can be made by the stream evaluator as to whether the connection profile of the user settings for the given stream is set to "best effort". If the determination at 370 is positive (e.g., YES), the method 300 can proceed to 380 (FIG. 5E). If the determination at 370 is negative (e.g., NO), the method can proceed to 390. At 390, a determination can be made by the stream evaluator as to whether a current protection level of the given stream is at a minimum protection level defined in the user settings. If the determination at 390 is positive (e.g., YES), the method 300 can return to 320 via connector "A". If the determination at 390 is negative (e.g., NO), the method 300 can proceed to 400 via connector "C" (FIG. 5C).

At 350, the method 300 proceeds to 410. At 410, a determination can be made by the stream evaluator as to whether the connection profile of the user settings for the given stream is set to "best effort". If the determination at 410 is positive (e.g., YES), the method 300 can proceed to 420. If the determination at 410 is negative (e.g., NO), the method can proceed to 430. At 430, the stream evaluator can increment a current protection level fail count (e.g., by one). The current protection level fail count can be stored, for example, in the configuration settings by the stream evaluator. At 440, a determination can be made by the stream evaluator as to whether a current protection level of the given stream is at a maximum protection level defined in the user settings. If the determination at 440 is positive (e.g., YES), the method 300 can proceed to 450. At 450, alert data can be generated by the stream evaluator that can indicate that the protection level for the given stream should be set to a higher level, but that the user settings are preventing the stream evaluator from setting the protection level to the higher level, and the method 300 can return to 320 (FIG. 5A).

If the determination at 440 is negative (e.g., NO), the method 300 can proceed to 460. At 460, the stream analyzer can attempt to determine a new protection level for the given stream. The new protection level can be a highest protection level that can be selected, such that for the current coding rate plus the new protection level is less than or equal to a maximum bandwidth for the given stream that is defined in the user settings. At 470, a determination by the stream analyzer can be made as to whether the new protection level was determined at 460. If the determination at 470 is positive (e.g., YES) the method 300 can proceed to 480. If the determination at 470 is negative (e.g., NO), the method 300 can proceed to 450.

At 480, the stream analyzer can signal a protection adjuster (e.g., the protection adjuster 126 of FIG. 2) of the adapter to increase the protection level of the given stream to the new protection level. In response, the protection adjuster can signal a packet protection component (e.g., the packet protection component 116 of FIG. 2) of the stream builder, which can cause the protection packet protection component to set the current protection level of the given stream to the new protection level. This adjustment can be an incremental adjustment that can be repeated over time or be adjusted in a more sweeping manner based on the feedback. At 490, a determination can be made by the stream evaluator as to whether the loss profile of the feedback signal indicates a bursty loss of packets. If the determination at 490 is positive (e.g., YES), the method 300 can proceed to 500. If the determination at 490 is negative (e.g., NO), the method can return to 320 (FIG. 5A). At 500, the stream evaluator can signal the protection adjuster to set interleaving for the given stream. In response, the protection adjuster can cause the packet protection component to implement interleaving on the given stream, such that packets of the given stream are transmitted to the content receiver in a non-sequential order.

From connector "C" 400, the method 300 proceeds to 510. At 510, the stream evaluator can signal the protection adjustment component to reduce the protection level of the given stream by a set amount (e.g., one level). In response, the protection adjustment component can cause the packet protection component to reduce the current protection level by the set amount determined by the stream evaluator. At 520, a determination can be made by the stream evaluator as to whether the protection level failed attempts is greater than or equal to a maximum protection failed attempts that are defined in the user settings. If the determination at 520 is positive (e.g., YES), the method 300 can proceed to 530. If the determination at 520 is negative (e.g., NO), the method 300 can proceed to 540.

At 530, the minimum protection level for the given stream can be set to the current protection level of the given stream. At 550, the stream evaluator can generate alert data that can indicate that the minimum protection level has been set to the current protection level and the method can return to 320 (FIG. 5A).

At 540, the stream evaluator can attempt to determine a new coding rate that is based on the reduction of the current protection level. At 560, the stream evaluator can signal a coding adjuster of the adapter to increase the current coding rate at an encoder of the stream builder to the new coding rate. At 570, the stream evaluator can signal the protection adjuster to set the current protection level for the given stream to the highest protection level that does not exceed the maximum bandwidth defined by the user settings in view of the new coding rate. At 580, a determination can be made by the stream evaluator as to whether the loss profile of the feedback signal indicates a bursty loss of packets. If the determination at 580 is positive (e.g., YES), the method 300 can proceed to 590. If the determination at 580 is negative (e.g., NO), the method can return to 320 (FIG. 5A). At 590, the stream evaluator can signal the protection adjuster to set interleaving for the given stream. In response, the protection adjuster can cause the packet protection component to implement interleaving on the given stream, such that packets of the given stream are transmitted to the content receiver in a non-sequential order.

At 420, the method 300 can proceed to 600. At 600, the packet evaluator can determine a new coding rate for the given stream. The new coding rate can be, for example, about 25% less than the current coding rate for the given stream. At 610, the stream evaluator can determine whether the current coding rate for the given stream is less than or equal to a minimum coding rate defined in the user settings. If the determination at 610 is positive (e.g., YES), the method 300 can proceed to 620. If the determination at 610 is negative (e.g., NO), the method 300 can proceed to 630. At 620, the stream evaluator can generate alert data that can indicate that the coding rate cannot be decreased due to the minimum coding rate defined in the user settings and the method 300 can return to 320 (FIG. 5A). At 630, the stream evaluator can signal the coding adjuster to decrease the current coding rate of the given stream to the greater of the new coding stream or the minimum coding rate defined in the user settings. In response, the coding adjuster can decrease the current coding rate employed by the encoder for the given stream based on the signal provided by the stream evaluator, and the method can return to 320 (FIG. 5A).

From connector "E" indicated at 380, the method 300 can proceed to 640. At 640, a determination can be made by the packet evaluator as to whether the current bandwidth usage for the given stream is less than a maximum bandwidth for the given stream defined in the user settings. If the determination at 640 is positive (e.g., YES), the method 300 can proceed to 650. If the determination at 640 is negative (e.g., NO), the method 300 can return to 320 (FIG. 5A). At 650, the stream evaluator can attempt to determine new coding rate for the given stream. The new coding rate can be, for example, 25% greater than the current coding rate of the given stream. Additionally, the stream evaluator can ensure that the new coding rate plus the overhead due to the protection level of the given stream is less than or equal to the maximum bandwidth for the given stream defined in the user settings. At 660, the stream evaluator can signal the coding adjuster to set the coding rate at the encoder of the stream builder to the new coding rate if the new coding rate has been determined at 650 and the method can return to 320 (FIG. 5A).

FIGS. 6A-6B illustrate a flow chart of an example method 700 for decoding media data. The method 700 could be executed, for example, by a plurality of packet recovery components (e.g., the M number of packet recovery components 214 illustrated in FIG. 4) and a decoder (e.g., the decoder 218 illustrated in FIG. 4). At 720, a decoder control of the decoder (e.g., the decoder control 220 illustrated in FIG. 4) can select a group of streams with a highest coding rate and designate the selected group as an active group. Each group of streams can contain one or more streams, as explained herein. For instance, in the second example discussed above, the active group could be group B. At 720, the method 700 proceeds to 730. At 730, the decoder controller can receive a packet decode event that could be provided from a given packet recovery component in response to the given packet recovery component storing a packet in a respective receiving buffer. At 740, the decoder controller can examine receiving buffers in each of the plurality of packet recovery components and determine whether another group (or more than one) of streams has the same encoding format as the active group, such that the active group and the other group have been encoded with the same encoding algorithm. If the determination at 740 is positive (e.g., YES), the method can proceed to 750 (FIG. 6B) via connector "B". If the determination at 740 is negative (e.g., NO), the method can proceed to 760.

At 760, the decoder control can cause the decoder to attempt to read a packet from the receiving buffer of the active group. At 770, a determination can be made as to whether a packet in the receiving buffer of the active group was available, such that the attempt to read the packet at 760 was successful. If the determination at 770 is positive (e.g., YES), the method 700 can proceed to 780. If the determination at 770 is negative (e.g., NO), the method 700 can proceed to 790. At 780, the packet that is retrieved can be decoded, and the method can return to 720.

At 790, the packet recovery component of the active group can update a lost packet count. At 800, the packet recovery component of the active group can initiate error concealment, which can include, for example, an attempt to reconstruct the lost packet based on the error codes. Additionally or alternatively, at 800, the decoder control can replay a last decoded packet, generate white noise, induce a gap in the output (e.g., a period of silence) or the like.

At 750 the method 700 can proceed to 810. At 810, the other group and any additional groups can also be selected as an active group, such that there is a plurality of active groups. At 820, the decoder control can prioritize the active groups. The prioritization of the active groups can be based, for example, on a coding rate and a packet loss rate of each group. At 830, a determination by the decoder control can be made as to whether the decoder has read each of the buffers in each of the active groups. If the determination at 830 is negative (e.g., NO), the method 700 can proceed to 840. If the determination at 830 is positive (e.g., YES), the method 700 can proceed to 850.

At 840, a group of the active groups with a highest priority can be selected, which group can be referred to as the selected group. At 860, the decoder control can signal the decoder to attempt to retrieve (e.g., drain) a packet from a receiving buffer associated with the selected group. At 870, the decoder control can determine if the packet was available in the receiving buffer based on whether the attempt to retrieve the packet from the receiving buffer of the selected group was successful. If the determination at 870 is negative (e.g., NO), the method 700 can return to 830. If the determination at 870 is positive (e.g., YES), the method 700 can proceed to 880.

At 850, each packet recovery component associated with a stream in the active group can update the lost packet count for the associated group of streams. At 890, each packet recovery component can initiate error concealment, which can include an attempt to reconstruct the lost packet based on the error codes embedded in the streams. Additionally or alternatively, at 890, the decoder control can replay a last decoded packet, generate white noise, induce a gap in the output (e.g., a period of silence) or the like.

At 880, the decoder control can cause the decoder to decode the retrieve packet and output the retrieved packet as part of an output signal. At 900, the decoder control can cause the decoder to signal each packet recovery component associated with each of the active groups to discard packets that correspond to the retrieved packet from the selected group, such that the buffers of the selected group and the other groups in the active groups remain in synchronization. The method can return to 720.

Figure 7:
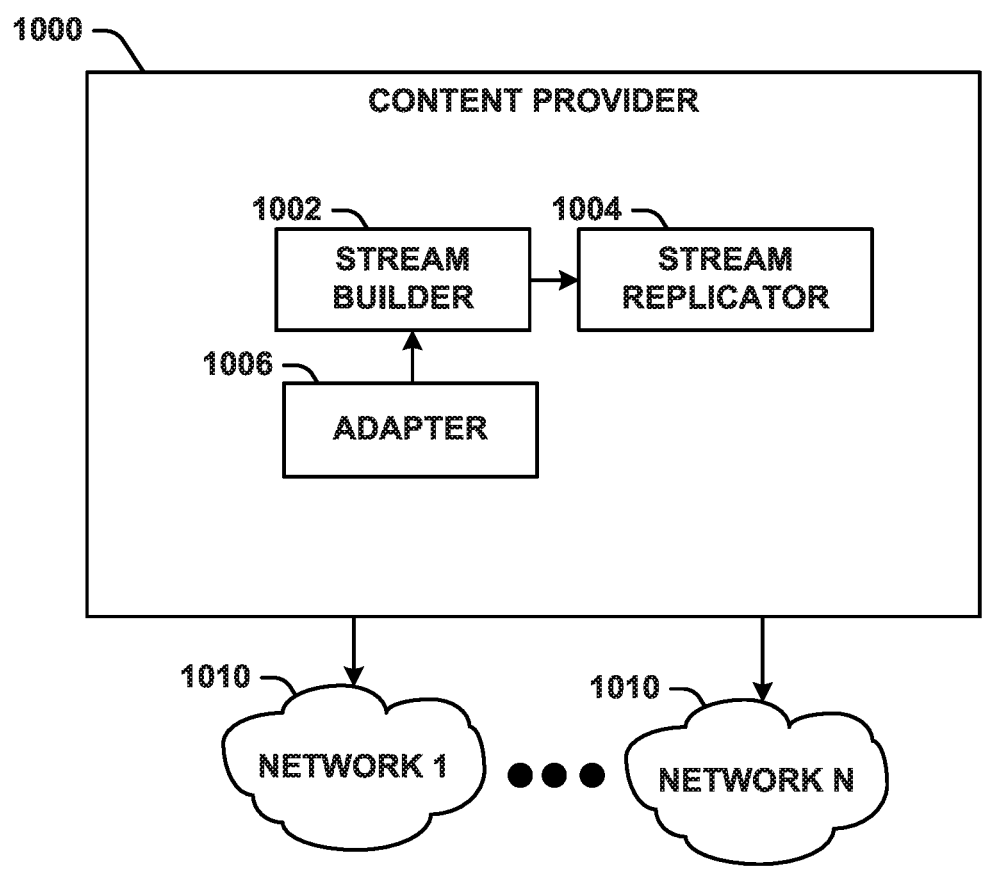
FIG. 7 illustrates another example of a content provider.

FIG. 7 illustrates another example of a content provider 1000 (e.g., a device) that could be employed as the content provider 4 illustrated in FIG. 1. The content provider 1000 can include a stream builder 1002 configured to encode media data at a plurality of different coding rates. The stream builder 1002 can also be configured to generate a plurality of streams encapsulating the encoded media data. Each of the plurality of streams can have an associated protection level that corresponds to an ability of packet reconstruction and a bandwidth cost. The content provider 1000 also include a stream replicator 1004 configured to transmit each of the plurality of streams to a content receiver via N number of networks 1110. The content provider can further include an adapter 1006 configured to control the coding rate and the protection level of each of the plurality of streams based on a feedback signal transmitted from the receiver. The feedback signal can characterize a packet loss rate of each of the plurality of streams.

Figure 8:
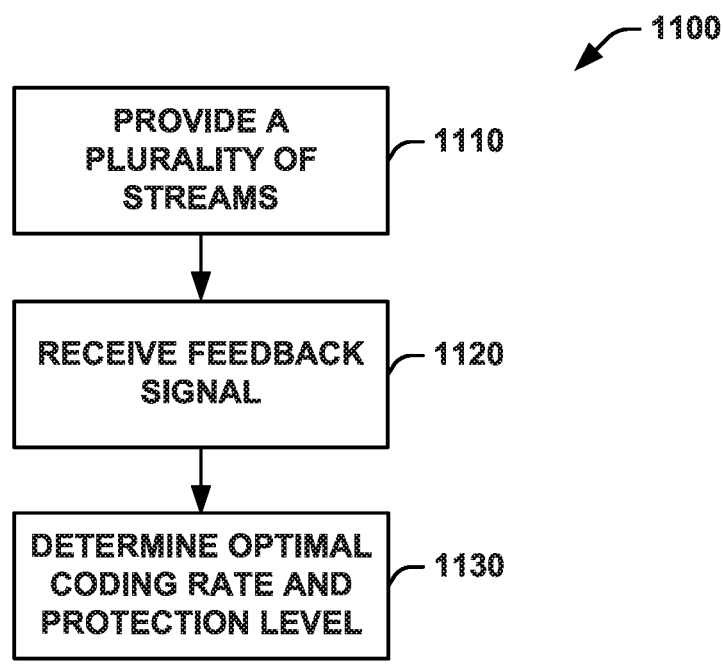
FIG. 8 illustrates an example method for providing real-time content to a content receiver.

FIG. 8 illustrates an example of a method 1100 for providing real-time data. The method could be implemented, for example, by a content provider (e.g., the content provider 4 illustrated in FIG. 1). At 1110, a plurality of streams can be provided, for example by a stream replicator (e.g., the stream replicator 28 of FIG. 1) of the content provider to a content receiver via a plurality of different networks. Each of the plurality of streams can encapsulate media data that is encoded at different coding rates. At 1120 a feedback signal can be received at an adapter (e.g., the adapter 24 illustrated in FIG. 1) of the content provider, which feedback signal is provided from the content receiver. The feedback signal can characterize a packet loss rate experienced by the content receiver for each of the plurality of streams. At 1130, a desired (e.g., optimal) coding rate and a desired (e.g., optimal) protection level can be determined by the adapter for each of the plurality of streams based on the feedback signal and on user settings.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A device comprising:
a stream builder that encodes media data to provide encoded media data at a plurality of different coding rates and generates a plurality of streams encapsulating the encoded media data;
a stream replicator that transmits each of the plurality of streams to a content receiver via N number of networks, wherein N is an integer greater than or equal to one; and
an adapter that determines a desired coding rate and a desired protection level for a given stream of the plurality of streams, the adapter selecting the desired protection level as one of a plurality of protection levels for the given stream of the plurality of streams based on a loss profile for the given stream of the plurality of streams, wherein the loss profile for the given stream of the plurality of streams is based on a feedback signal provided by the content receiver.

2. The device of claim 1, wherein the loss profile characterizes whether packet loss for the given stream is bursty or random.

3. The device of claim 1, wherein, in response to the loss profile characterizing the packet loss for the given stream as bursty, the stream builder interleaves the given stream, such that packets of the given stream are transmitted to the content receiver in a non-sequential order.

4. The device of claim 3, wherein the stream builder adds error correction codes to the packets of the given stream that are transmitted to the content receiver.

5. The device of claim 2, wherein, in response to the loss profile characterizing the packet loss for the given stream as random, the stream builder adds error correction codes to the given stream.

6. The device of claim 5, wherein the error correction codes are forward error correction (FEC) codes.

7. The device of claim 1, wherein the desired protection level for the given stream is dynamically selected based on the loss profile for the given stream during the transmission of the given stream from the device to the content receiver.

8. The device of claim 1, wherein
the feedback signal comprises the loss profile for the given stream of the plurality of streams,
N is an integer greater than or equal to two, and
a given network of the N number of networks is a public network and another network of the N number of networks is a private network.

9. A system for providing real-time data comprising:
a content provider device comprising:
a stream builder that encodes media data at a plurality of different coding rates and generates a plurality of streams encapsulating the encoded media data;
a stream replicator that transmits each of the plurality of streams to a content receiver device via N number of networks, wherein N is an integer greater than or equal to one; and
an adapter that determines a desired coding rate and a desired protection level for a given stream of the plurality of streams, the adapter selecting the desired protection level as one of a plurality of protection levels for the given stream of the plurality of streams based on a loss profile for the given stream of the plurality of streams, wherein the loss profile for the given stream of the plurality of streams is based on a feedback signal provided by the content receiver device.

10. The system of claim 9, wherein the loss profile characterizes whether packet loss for the given stream is bursty or random.

11. The system of claim 10, wherein, in response to the loss profile characterizing the packet loss for the given stream as bursty, the stream builder interleaves the given stream, such that packets of the given stream are transmitted to the content receiver device in a non-sequential order.

12. The system of claim 10, wherein the stream builder adds error correction codes to the packets of the given stream that are transmitted to the content receiver.

13. The system of claim 10, wherein, in response to the loss profile characterizing the packet loss for the given stream as random, the stream builder adds error correction codes to the given stream when the loss profile characterizes the packet loss for the given stream as random.

14. The system of claim 13, wherein the error correction codes are forward error correction (FEC) codes.

15. The system of claim 9, wherein the content receiver device comprises:
a plurality of group receivers, each of the plurality of group receivers receiving each of the plurality of streams that have a common group identifier (ID);
a plurality of packet recovery components, each of the plurality of packet recovery components storing packets from streams with a common Group ID in a respective receiving buffer of a plurality of receiving buffers, the feedback signal being generated by one or multiple of the of packet recovery components; and
a decoder that selects an active group from the plurality of receiving buffers based on an encoding format of packets stored at each of the plurality of receiving buffers and decodes a packet retrieved from the selected active group to generate an output signal.

16. The system of claim 9, wherein
the feedback signal comprises the loss profile for the given stream of the plurality of streams,
N is an integer greater than or equal to two, and
a given network of the N number of networks is a public network and another network of the N number of networks is a private network.

17. A method of providing real-time data comprising:
providing a plurality of streams to a content receiver via N number of different networks, wherein N is an integer greater than or equal to one, and wherein each of the plurality of streams encapsulates media data that is encoded at a given coding rate of a plurality of coding rates; and
determining a desired coding rate and a desired protection level for a given stream of the plurality of streams, wherein the desired protection level is selected as one of a plurality of protection levels for the given stream based on a loss profile for the given stream of the plurality of streams, wherein the loss profile for the given stream of the plurality of streams is based on a feedback signal provided by the content receiver.

18. The method of claim 17, wherein the loss profile characterizes whether packet loss for the given stream is bursty or random.

19. The method of claim 18, wherein, in response to the loss profile characterizing the packet loss for the given stream as bursty, the method further comprises interleaving the given stream, such that packets of the given stream are transmitted to the content receiver in a non-sequential order.

20. The method of claim 19, wherein the method further comprises adding forward error correction (FEC) codes to the given stream.

21. The method of claim 18, wherein, in response to the loss profile characterizing the packet loss for the given stream as random, the method further comprises adding forward error correction (FEC) codes to the given stream.

22. The method of claim 17, wherein the desired protection level for the given stream is dynamically selected based on the loss profile during the transmission of the given stream to the content receiver.

* * * * *